United States Patent
Samuelsson et al.

(10) Patent No.: US 12,067,555 B2
(45) Date of Patent: Aug. 20, 2024

(54) METHOD, SYSTEM, DEVICES AND COMPUTER PROGRAM PRODUCTS FOR HANDLING DIGITAL PAYMENTS BETWEEN PAYERS AND PAYEES BEING IN PHYSICAL PROXIMITY TO EACH OTHER

(71) Applicant: CRUNCHFISH DIGITAL CASH AB, Malmö (SE)

(72) Inventors: Joachim Samuelsson, Helsingborg (SE); Paul Cronholm, Malmö (SE)

(73) Assignee: CRUNCHFISH DIGITAL CASH AB, Malmo (SE)

( * ) Notice: Subject to any disclaimer, the term of this patent is extended or adjusted under 35 U.S.C. 154(b) by 56 days.

(21) Appl. No.: 17/796,050

(22) PCT Filed: Dec. 22, 2020

(86) PCT No.: PCT/SE2020/051251
§ 371 (c)(1),
(2) Date: Jul. 28, 2022

(87) PCT Pub. No.: WO2021/154136
PCT Pub. Date: Aug. 5, 2021

(65) Prior Publication Data
US 2023/0065383 A1    Mar. 2, 2023

(30) Foreign Application Priority Data

Jan. 29, 2020 (SE) ................................. 2050086-4
Feb. 11, 2020 (SE) ................................. 2050145-8
(Continued)

(51) Int. Cl.
*G06Q 20/10* (2012.01)
*G06Q 20/32* (2012.01)
(Continued)

(52) U.S. Cl.
CPC ....... *G06Q 20/3278* (2013.01); *G06Q 20/108* (2013.01); *G06Q 20/3678* (2013.01);
(Continued)

(58) Field of Classification Search
None
See application file for complete search history.

(56) References Cited

U.S. PATENT DOCUMENTS

| 10,366,378 B1* | 7/2019 | Han ...................... G06Q 20/204 |
| 2006/0163345 A1* | 7/2006 | Myers .................... G06Q 20/10 |
| | | 235/380 |

(Continued)

FOREIGN PATENT DOCUMENTS

WO    2015148850 A1    10/2015

OTHER PUBLICATIONS

International Search Report and Written Opinion of International Application No. PCT/SE2020/051251, all pages cited in its entirety.
(Continued)

*Primary Examiner* — William J Jacob
(74) *Attorney, Agent, or Firm* — Burr & Forman LLP

(57) ABSTRACT

A method (600) for handling a digital payment between a payer (P1) and a payee (P2) is presented. The payer and payee communication devices (PD1, PD2) uses (610) short-range data communication (SRDC) when the devices are in proximity of each other to agree upon a digital payment (DP) without requiring long-range data communication with a remote digital payment settlement service (DPSS) at that stage. Independently of the other device, the payer communication device (PD1) or the payee communication device (PD2) subsequently communicates (630) buffered digital payment information (DPI) to the remote digital payment settlement service (DPSS) by long-range data communication (LRDC1, 15 LRDC2). The remote digital payment
(Continued)

settlement service (DPSS) causes settlement (640) of the digital payment (DP) as indicated by the digital payment information (DPI) received by long-range data communication (LRDC1, LRDC2) from one of the payer communication device and the payee communication device (PD1, PD2).

25 Claims, 17 Drawing Sheets

(30) Foreign Application Priority Data

| | | |
|---|---|---|
| Jul. 3, 2020 | (SE) | 2050844-6 |
| Oct. 15, 2020 | (SE) | 2051201-8 |

(51) Int. Cl.
*G06Q 20/36* (2012.01)
*G06Q 20/38* (2012.01)
*G06Q 20/40* (2012.01)
*H04L 9/08* (2006.01)
*H04L 9/32* (2006.01)

(52) U.S. Cl.
CPC ....... *G06Q 20/3823* (2013.01); *G06Q 20/389* (2013.01); *G06Q 20/401* (2013.01); *H04L 9/0825* (2013.01); *H04L 9/3247* (2013.01); *H04L 9/3263* (2013.01)

(56) References Cited

U.S. PATENT DOCUMENTS

| | | | |
|---|---|---|---|
| 2008/0167988 A1* | 7/2008 | Sun | G06Q 20/3278 455/406 |
| 2013/0317835 A1* | 11/2013 | Mathew | G06Q 10/10 705/40 |
| 2014/0372300 A1 | 12/2014 | Blythe | |
| 2016/0253663 A1* | 9/2016 | Clark | G06Q 20/341 705/75 |
| 2017/0083895 A1 | 3/2017 | Colin et al. | |
| 2018/0068293 A1* | 3/2018 | Dunne | G06Q 20/3672 |
| 2018/0181964 A1* | 6/2018 | Zagarese | G06Q 20/40145 |
| 2019/0095907 A1* | 3/2019 | Govindarajan | G06Q 20/367 |
| 2019/0102756 A1 | 4/2019 | Zhoe et al. | |

OTHER PUBLICATIONS

11—Crytopgraphy in EMV, EMV Master Class, Empowering Trust, all pages cited in its entirety.

Qin Zhen et al., "A secure and privacy-preserving mobile wallet with outsourced verification in cloud computing", Computer Standards & Interfaces, Elsevier Sequoia, Lausanne, CH, vol. 54, Nov. 26, 2016 (Nov. 26, 2016), pp. 55-60, XP085011133, ISSN: 0920-5489, DOI: 10.1016/J.CSI.2016.11.012.

Anonymous: "Bitcoin NFC Tap to Pay", Dec. 22, 2014 (Dec. 22, 2014), XP093117418, Retrieved from the Internet: URL:https://edge.app/blog/market-updates/bitcoin-nfc-tap-to-pay/ [retrieved on Jan. 9, 2024].

* cited by examiner

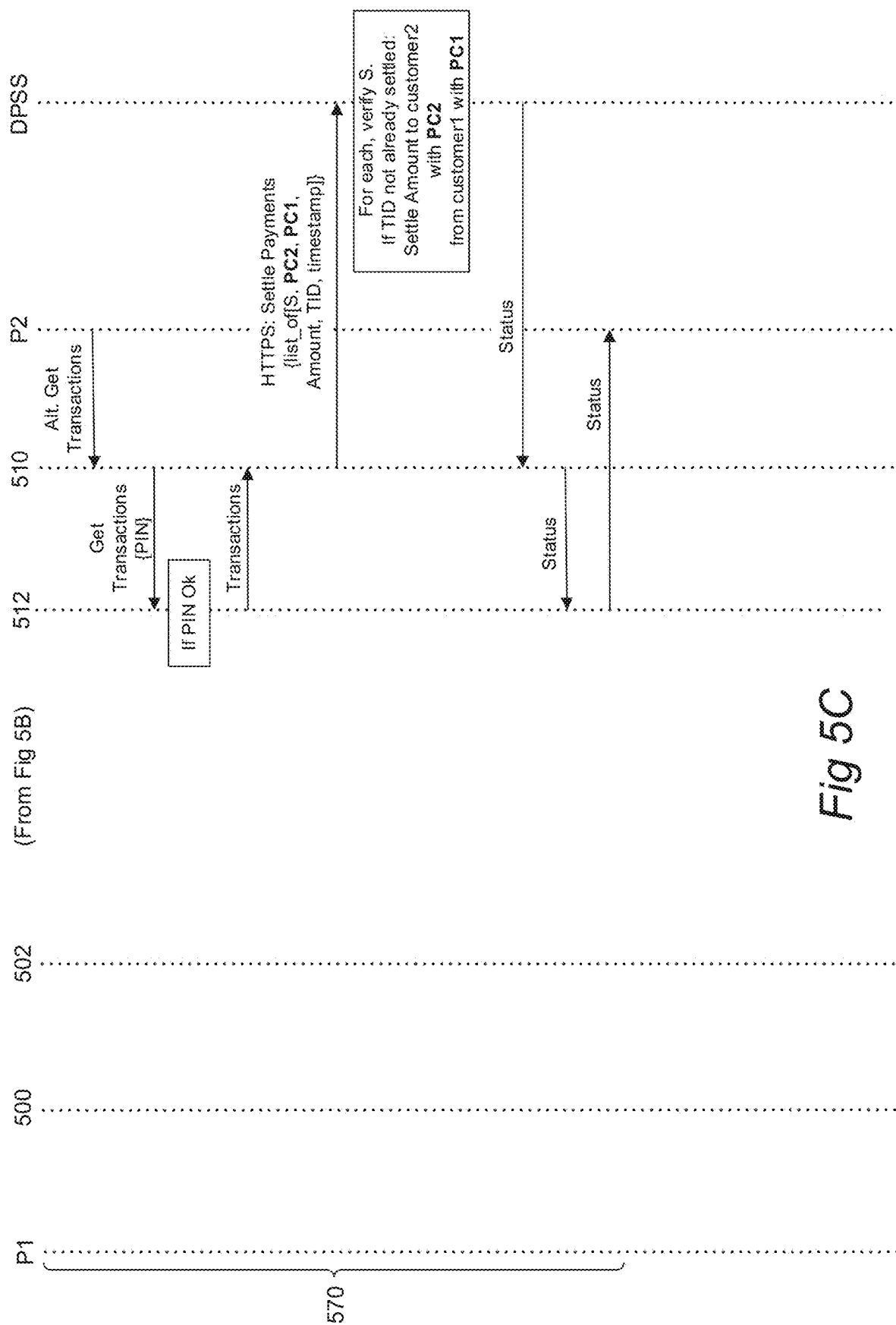

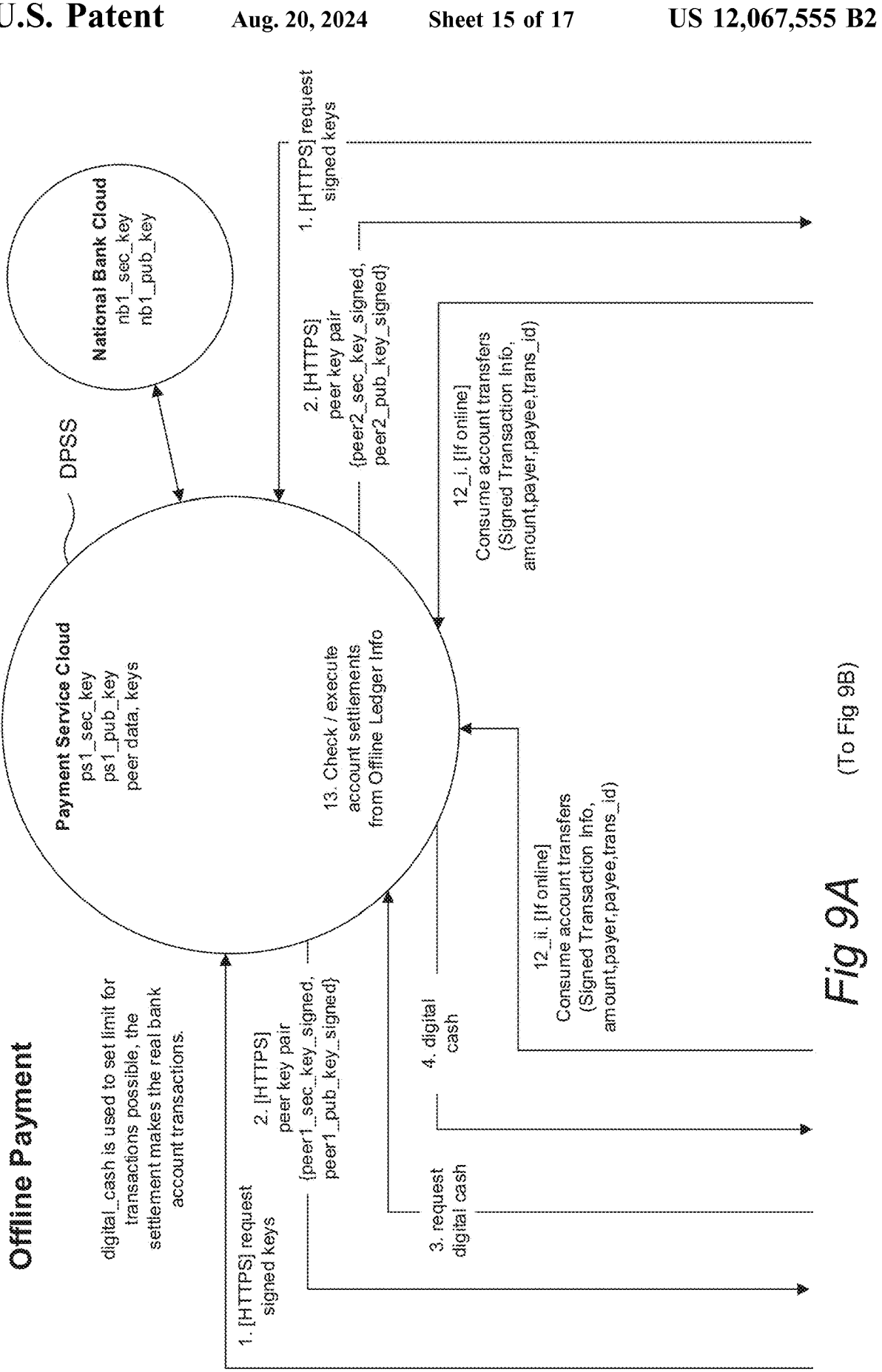
Fig 9A (To Fig 9B)

METHOD, SYSTEM, DEVICES AND COMPUTER PROGRAM PRODUCTS FOR HANDLING DIGITAL PAYMENTS BETWEEN PAYERS AND PAYEES BEING IN PHYSICAL PROXIMITY TO EACH OTHER

TECHNICAL FIELD

The present invention generally relates to the field of digital payments. More particularly, the present invention relates to technical improvements for digital payments between payers and payees that are physically proximate to each other, e.g. that appear or meet at a physical place such as, for instance, a shop, restaurant, theatre, sport arena, workshop, or basically any place where humans can meet to perform a digital payment. Even more particularly, the present invention relates to a method and a communication system for handling a digital payment between a payer and a payee by the provision of a payer communication device, used by the payer, and a payee communication device, used by the payee, when the devices are in proximity to each other, and to a communication system for performing the method. Moreover, the invention relates to associated communication devices, computer program products and computer readable media.

BACKGROUND

As everybody knows, there has been an overwhelming market penetration for mobile communication devices such as smart phones and tablets at least during the last decade. Long gone are the days when mobile communication devices were primarily used for voice calls. Typically, mobile communication devices are enabled for wide-area network, WAN, communication (broadband RF communication) with remote entities, for instance via cellular radio systems like 5G, UMTS or GSM, or via wireless local area network, WLAN, access for routing IP traffic to and from such remote entities. In addition, mobile communication devices are often enabled for short-range wireless data communication, such as Bluetooth, with other devices nearby. Such a nearby device may for instance be an accessory or peripheral device, like a wireless headset or wireless speakers.

Thanks to their ability for WAN communication, users of mobile communication devices may enjoy a plethora of digital services that involve communication with cloud-based resources. A very popular type of such digital services is digital payments. A special kind of digital payments is the digital proximity payment that allows a user of a mobile communication device to make a digital payment when being physically proximate to another entity at a physical place such as, for instance, a shop, restaurant, theatre, sport arena, workshop, or basically any place where a human may want to perform a digital payment. The other entity may be another communication device which is controlled by a human user (such as a smart phone, tablet, payment terminal, checkout counter, etc.), or another communication device that operates more autonomously (such as a service terminal, vending machine, ticket machine, access control system, etc.).

Throughout this document, the term "digital payment" is to be construed broadly to embrace any kind of transfer of economic value in digital form on behalf of or between people of any types, roles etc.

A communication system 100 for performing real-time digital proximity payments according to the prior art is presented in FIG. 1A. More specifically, FIG. 1A illustrates the performance of a type of digital proximity payment which is often referred to as a push transaction. The communication system 100 comprises a payer communication device PD1, a payee communication device PD2, and cloud-based digital payment settlement service DPSS which is accessible by WAN communication. A payer P1 wishes to make a digital payment to a payee P2, for instance in order to buy a product, enjoy a service, settle a debt, or gain access to something controlled by the payee P2. As can be seen at 102 in FIG. 1, the payer P1 brings or has brought the payer communication device PD1 in proximity to the payee communication device PD2, or alternatively the other way around. The payer communication device PD1 and the payee communication device PD2 can, for instance, be of any of the exemplary types mentioned above.

The digital payment settlement service DPSS assists in performing a digital payment transaction to transfer an economic value from an account associated with the payer P1 (or with another entity represented by the payer P1) to an account associated with the payee P2 (or with another entity represented by the payee P2, such as a merchant, shop owner, service provider, etc.). The accounts can be managed by the digital payment settlement service DPSS itself or alternatively by other entities, such as banks or other financial institutes.

In order for the digital payment to be carried out, the payee communication device PD2 makes payment details available to the payer communication device PD1. This may involve generating a QR (Quick Response) code 104 and presenting it on a display, so that the QR code 104 can be scanned 103 by the payer communication device PD1. Alternatively, the payment details may be provided by the payee communication device PD2 to the payer communication device PD1 by other means of communication, including short-range wireless communication such as NFC.

The payment details will typically comprise an amount to be paid, a transaction identifier and/or an identifier associated with the payee communication device PD2 (or payee user P2).

The payer communication device PD1 extracts the payment details from the QR code 104 (or the received NFC data, etc.). As seen at 112, the payer communication device PD1 then communicates with the digital payment settlement service DPSS by wide-area network, WAN, communication 110 to authorize the digital payment and cause settlement of the digital payment. The authorization may typically involve electronic authentication (identification) of the payer communication device PD1 or the payer P1. Authorization and settlement of the digital payment take place momentarily, and the digital payment is therefore a real-time payment.

The digital payment settlement service DPSS may be constituted by different parts or entities, such as a payment service front-end towards the payer communication device PD1 and a payment settlement back-end that is operative to settle the digital payment transaction, if needed by communication with external entities for clearing (such as banks). If, for some reason, the authorization and settlement communication 112 with the digital payment settlement service DPSS is not possible because of a momentary failure in WAN access 110, or if an entity in the digital payment settlement service DPSS or a related entity such as an online bank or clearing service is momentarily unavailable, the real-time digital proximity payment will not be performed or completed successfully.

Another common way of performing a digital proximity payment is by means of a pull transaction. This is illustrated in FIG. 1B. Like the system 100 in FIG. 1A, the communication system 100' in FIG. 1B comprises a payer communication device PD1, a payee communication device PD2, and cloud-based digital payment settlement service DPSS which is accessible by WAN communication. Here, in order for the digital payment to be carried out, the payer communication device PD1 makes payment details available to the payee communication device PD2. This may involve generating a QR code 104' and presenting it on a display, so that it can be scanned 103' by the payee communication device PD2. Alternatively, it can be made by means of NFC communication or other short-range wireless communication, or by presenting a smart card having an electronically memory which is readable by the payee communication device PD2.

The cloud-based digital payment settlement service DPSS may typically be an EMV card rail (Europay, Mastercard and VISA), and the payer communication device PD1 may typically run digital payment OEM software such as Apple Pay, Google Pay or Samsung Pay, or alternatively software based on HCE (Host Card Emulation). The payment details thus contains information which will enable the digital payment settlement service DPSS to derive the payer account.

The payee communication device PD2 obtains the payment details from the QR code 104' (or the received NFC data, etc.). The payee communication device PD2 then communicates 122 with the digital payment settlement service DPSS by WAN communication 120 to verify that the digital payment is allowable (e.g. by checking that a payer account as derived from the payment details has a sufficient balance to cover the payment amount), and cause settlement of the digital payment.

If the verification and settlement communication 122 with the digital payment settlement service DPSS is not possible because of a momentary failure in WAN access 120, or if an entity in the digital payment settlement service DPSS or an external entity such as an online bank or clearing service, is momentarily unavailable, the digital proximity payment will not be performed or completed successfully. A limited exception to this is when the payee communication device PD2 has been granted a certain floor limit by the acquirer that allows it to buffer a few digital proximity payments offline in the device PD2 (for instance when the payments cannot be settled immediately), and then send the buffered digital proximity payments for settlement by the digital payment settlement service DPSS when the opportunity arises.

As can be understood from the above, a difference between a push transaction and a pull transaction in the prior art can be seen in which of the payer communication device PD1 and payee communication device PD2 causes the settlement by WAN communication with the cloud-based digital payment settlement service DPSS. The settlement of a push transaction is in this sense driven by the payer communication device PD1, whereas the settlement of a pull transaction is driven by the payee communication device PD2.

As the skilled reader will notice, the functionality for performing digital proximity payments like, for instance, in FIG. 1A or 1B, generally relies on the cloud-based digital payment settlement service DPSS (including any related entities in the cloud, such as online bank or clearing services) being operational and accessible at the moment the digital proximity payment is to be performed between the payer P1 and payee P2.

It moreover requires access to WAN communication between the payer communication device PD1 and the digital payment settlement service DPSS, or between the payee communication device PD2 and the digital payment settlement service DPSS, respectively. However, WAN communication for mobile communication devices is far from always reliable and may be subject to variations in accessibility due to cellular network capacity or coverage, radio signal interference and fading, etc. Furthermore, the cloud-based digital payment service functionality as such may be fully or partly inoperative from time to time. This may pose quite undesired limitations on the usability and credibility of digital proximity payments according to the prior art. The present inventors have accordingly realized that there is room for improvements in this regard. Hence, the present inventors have identified both the need for and the benefits of a novel and inventive manner of performing digital proximity payments of the general kind described above.

SUMMARY

It is accordingly an object of the invention to solve, eliminate, alleviate, mitigate or reduce at least some of the problems and shortcomings referred to above.

In summary, the present invention enables offline frictionless mobile payments. This is a huge breakthrough and has strong potential to change the global payment ecosystem. The innovation makes digital proximity payment services far more robust, as the moment of payment between payer and payee will function in the same way, regardless of whether the payer and/or the payee is offline and furthermore regardless of whether or not cloud-based resources for handling the digital payment are fully operational and accessible at the moment of performing the payment between payer and payee. Hence, a novel and inventive technical design of a communication system and method for performing digital proximity payments, as presented in this document, will circumvent technical problems in the prior art. Such problems may pertain to temporary inoperability of cloud-based digital resources for payment authorization, verification and settlement. Such problems may also pertain to unstable WAN connectivity, insufficient or varying bandwidth for broadband communication, WAN load balancing issues, network communication timeout issues, etc. As explained in the Background section, the problems in the prior art may jeopardize the robustness of conventional digital proximity payments or even make such payments impossible to perform in some environments or situations. Digital payments are therefore potentially unreliable with prior art solutions. Many users have negative experience from not being able to complete a payment transaction. As explained above, this can be due to poor internet access, no mobile coverage, or that the whole payment service or any part thereof is down. In countries with less developed IT infrastructure this is an even greater issue standing in the way of full digitalization of payments.

The present inventors tackle this by offering offline frictionless mobile payments. The transaction works even if neither the payer nor the payee have access to the internet, do not have mobile network coverage or are not connected to the payment services backend. The invention makes this possible by differentiating between an offline payment settlement at the moment of payment, and a subsequent online payment settlement involving the transfer of money in the cloud. In order to have funds to use offline the users can reserve money in for instance their bank or card accounts for offline use, or arrange credit for offline payments. This can be seen as the digital equivalent of withdrawing money at an automated teller machine, ATM, and carrying physical cash around in a wallet. The digital money may be placed in a mobile (digital) wallet and can be used in the same way as physical cash. Embodiments of the invention have the potential to support national central banks' plans for a value-based e-currency.

The offline payment works just as well for a peer-to-peer case, where the mobile transaction is done straight to an app on the payee's mobile communication device, as it does for a business-to-consumer, B2C, case, where the mobile transaction goes from a customer via, for instance, a payment terminal to a physical cash register operated by a merchant in store.

In embodiments of the invention, at the moment of payment, the transaction is digitally signed by the payer and transmitted locally to the payee, so the payee has a digitally signed commitment which can be seen as a digital equivalent of a banker's cheque as it is guaranteed. If both parties are offline at the moment of payment, the transfer of money between accounts will take place later when one of the parties has internet connection and access to the payment service's back-end in the cloud. Transactions are logged locally by both the payer and the payee in respective communication devices. An offline digital balance is updated locally in the payer's communication device. In some embodiments, a local offline digital balance is updated also in the payee's communication device. In cases where one or both parties are online, the transfer of money may, in alternative embodiments, take place at the moment of payment, but preferably still as a subsequent online settlement stage.

As has been explained above in the Background section, when performing push-type real-time payments, a common way to inform the payer about who shall receive payment is for the payer to scan a QR code that contains the payee details. It is possible to include the QR code amount with a so called dynamic QR code that always has to be shown on a digital screen. QR codes can also be used for pull-type real-time payments. With QR codes the communication is always one-way towards the device scanning the QR code. The QR code is simply an image and cannot receive any information, in contrast to a bidirectional short range RF data communication link, such as Bluetooth.

Embodiments of the present invention are, in an advantageous but non-limiting sense, based on the use of dynamic QR codes. This creates huge advantages and enormous possibilities, especially for areas where internet connection and sometimes even mobile coverage is a problem. Since QR codes only make one-way local communication possible, internet connection and communication via the payment service in the cloud is needed for both the payer and receiver in order for them to digitally register the payment. The breakthrough made by the present inventions complements the eco system for QR codes, since payments will be able to be made, even if one or both of the parties are offline. This will still be perceived as a real-time payment to the payer and payee, even though the communication with the cloud-based payment service takes place later.

In line with the observations above, the present inventors have made valuable technical insights. These insights will be presented as inventive aspects in the following and are also reflected by the appended independent claims. The inventive aspects will be described in more detail in the Detailed Description section, together with refinements (embodiments) thereof, which are also reflected by the appended dependent claims.

A first aspect of the present invention is a method for handling a digital payment between a payer and a payee, the method involving:

a payer communication device, used by the payer, and a payee communication device, used by the payee, using short-range data communication when the devices are in proximity of each other to agree upon a digital payment without requiring long-range data communication with a remote digital payment settlement service at that stage;

the payer communication device and the payee communication device both buffering digital payment information pertaining to the digital payment locally in the respective device;

independently of the other device, the payer communication device or the payee communication device subsequently communicating the buffered digital payment information to the remote digital payment settlement service by long-range data communication; and the remote digital payment settlement service causing settlement of the digital payment as indicated by the digital payment information received by long-range data communication from one of the payer communication device and the payee communication device without having to wait for the digital payment information to be received from the other one of the payer communication device and the payee communication device.

This is beneficial since it allows a digital payment transaction to be performed even in situations where one of a payee communication device and a payer communication device lacks momentary (or even permanent) ability for wide-area network, WAN, communication with a cloud-based digital payment service functionality.

Additional aspects of the present invention are defined by the appended independent claims being directed at communication devices, a communication system, computer program products and computer readable media.

A key feature of the present invention and its advantageous embodiments is the ingenious idea of splitting the digital payment process in two subsequent stages. First, there is an offline stage with local settlement between payer and payee. This involves only proximity communication between the payer communication device and the payee communication device to settle the payment transaction offline and instantly between the payer and payee at the moment of payment, with a guarantee for the payee to get paid. Then, there is a sequentially separate stage of sending locally buffered digital payment transactions, independently by one or both of the payer and payee, to the cloud for final online settlement. This inventive approach takes away any and all online issues, including connectivity problems and payment service time-outs.

As used in this document, the term "short-range data communication" includes any form of proximity-based device-to-device communication, unidirectional or bidirectional. This includes radio-based short-range wireless data communication such as, for instance, Bluetooth, BLE (Bluetooth Low Energy), RFID, WLAN, WiFi, mesh communication or LTE Direct, without limitation. It also includes non-radio-based short-range wireless data communication such as, for instance, magnetic communication (such as NFC), audio communication, ultrasound communication, or optical communication (such as QR, barcode, IrDA).

As used in this document, the term "wide-area network communication" (abbreviated as "WAN communication") includes any form of data network communication with a party which may be remote (e.g. cloud-based), including cellular radio communication like W-CDMA, GSM, UTRAN, HSPA, LTE, LTE Advanced or 5G, possibly communicated as TCP/IP traffic, or via a WLAN (WiFi) access point, without limitation. Moreover, the terms "long-range data communication" and "broadband data communication" are considered as synonyms of "wide-area network communication".

As used in this document, the term "communication device" includes a mobile communication device, a mobile phone, a smart phone, a tablet computer, a personal digital assistant, a portable computer, smart glasses, a smart wearable (e.g. smart watch or smart bracelet), a smart card, a payment terminal, a service terminal, a point-of-sales terminal, a checkout counter, a delivery pickup point, a vending machine, a ticket machine, a dispensing machine and an access control system, without limitation.

Other aspects, objectives, features and advantages of the inventive aspects will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

FIG. 3A illustrates offline settlement whereas FIG. 3B illustrates subsequent online settlement.

FIGS. 5A-5C illustrate a schematic diagram of a communication system for handling digital proximity payments according to a second beneficial embodiment of the present invention, where the payer communication device as well as the payee communication device have an application and a secure element for performing the payer communication device's and the payee communication device's part of the digital payment functionality, respectively, to cause offline settlement and subsequent online settlement.

FIGS. 9A and 9B illustrate a schematic diagram of a communication system for handling digital proximity payments according to an alternative embodiment of the present invention.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like drawings references refer to like elements throughout, particularly such that an element being referred to as "ynn" in a second drawing is to be understood as the same as or the equivalent of an element being referred to as "xnn" in a first drawing, where x and y are single-digit numbers and nn is a double-digit number. When the same drawings reference is used for an element that appears in multiple drawings, such element is to be understood as being the same or at least equivalent throughout such multiple drawings. Elements illustrated as hatched boxes are generally to be seen as optional in the particular drawing in which they appear.

Figure 1A:
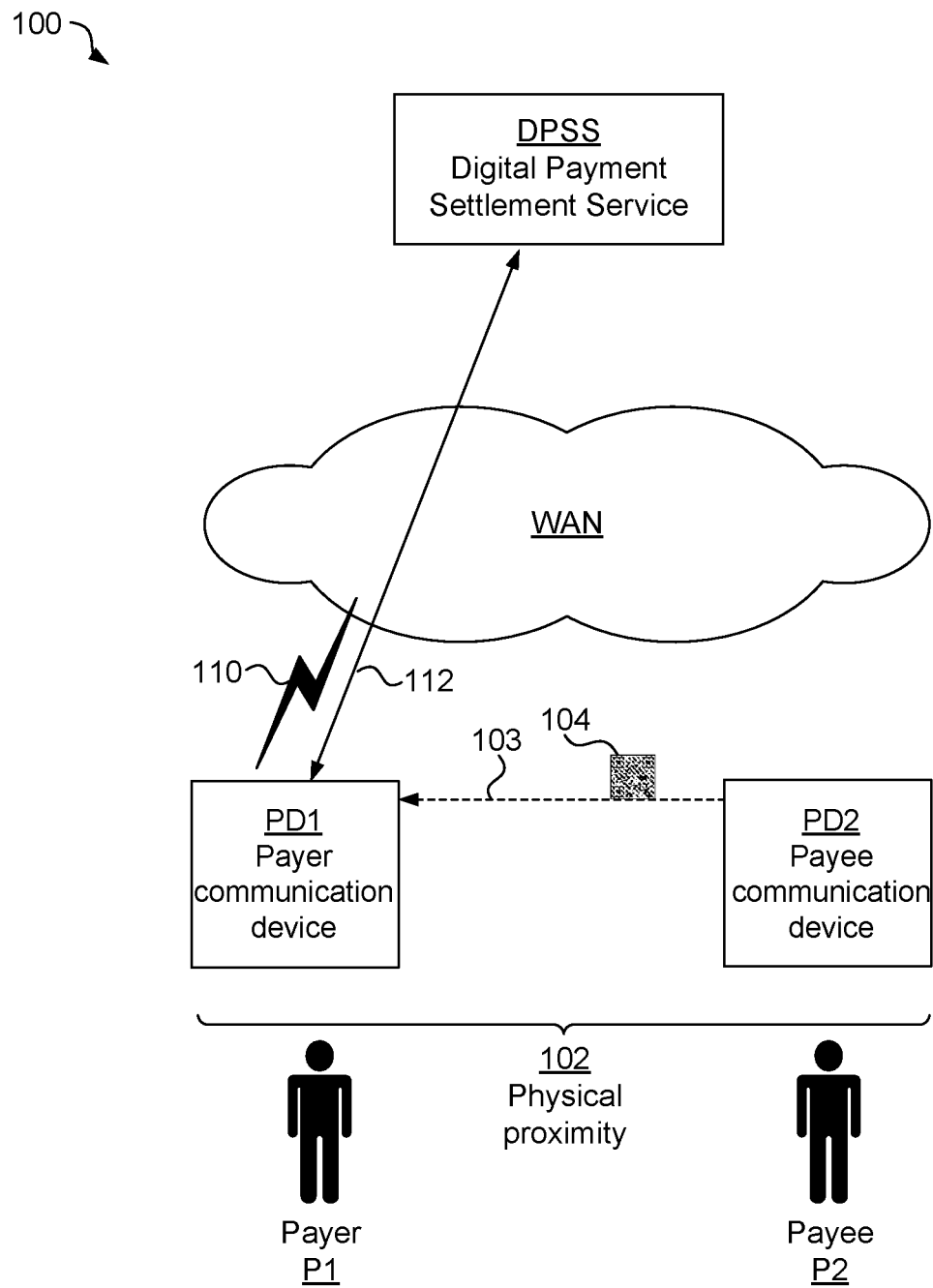
FIG. 1A is a schematic diagram of a communication system for performing a type of digital proximity payment referred to as a push transaction according to the prior art, involving a payer communication device, a payee communication device and a cloud-based digital payment settlement service which is accessible by wide-area network communication.
Figure 1B:
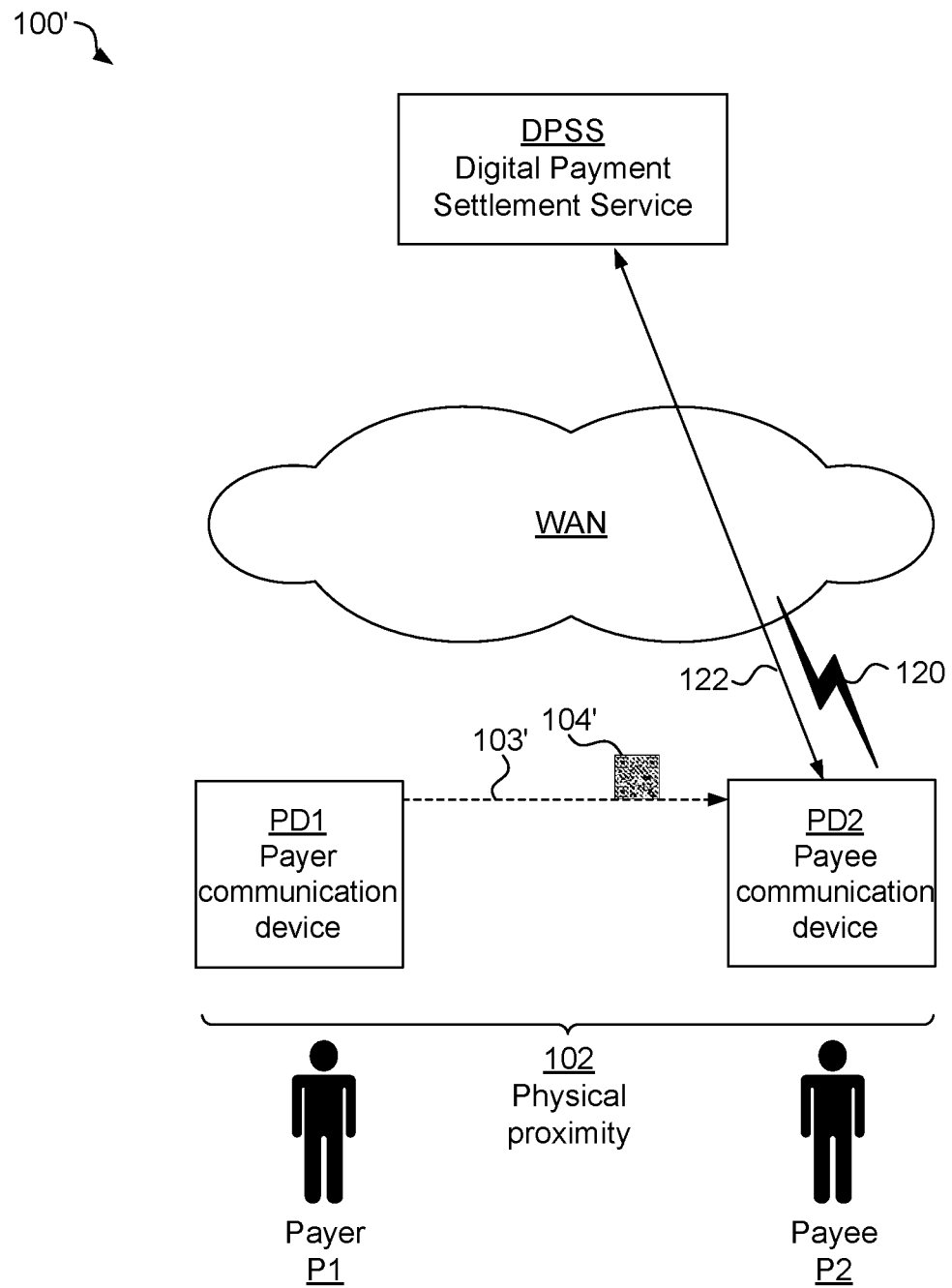
FIG. 1B is a schematic diagram of a communication system for performing a type of digital proximity payment referred to as a pull transaction according to the prior art.
Figure 2A:
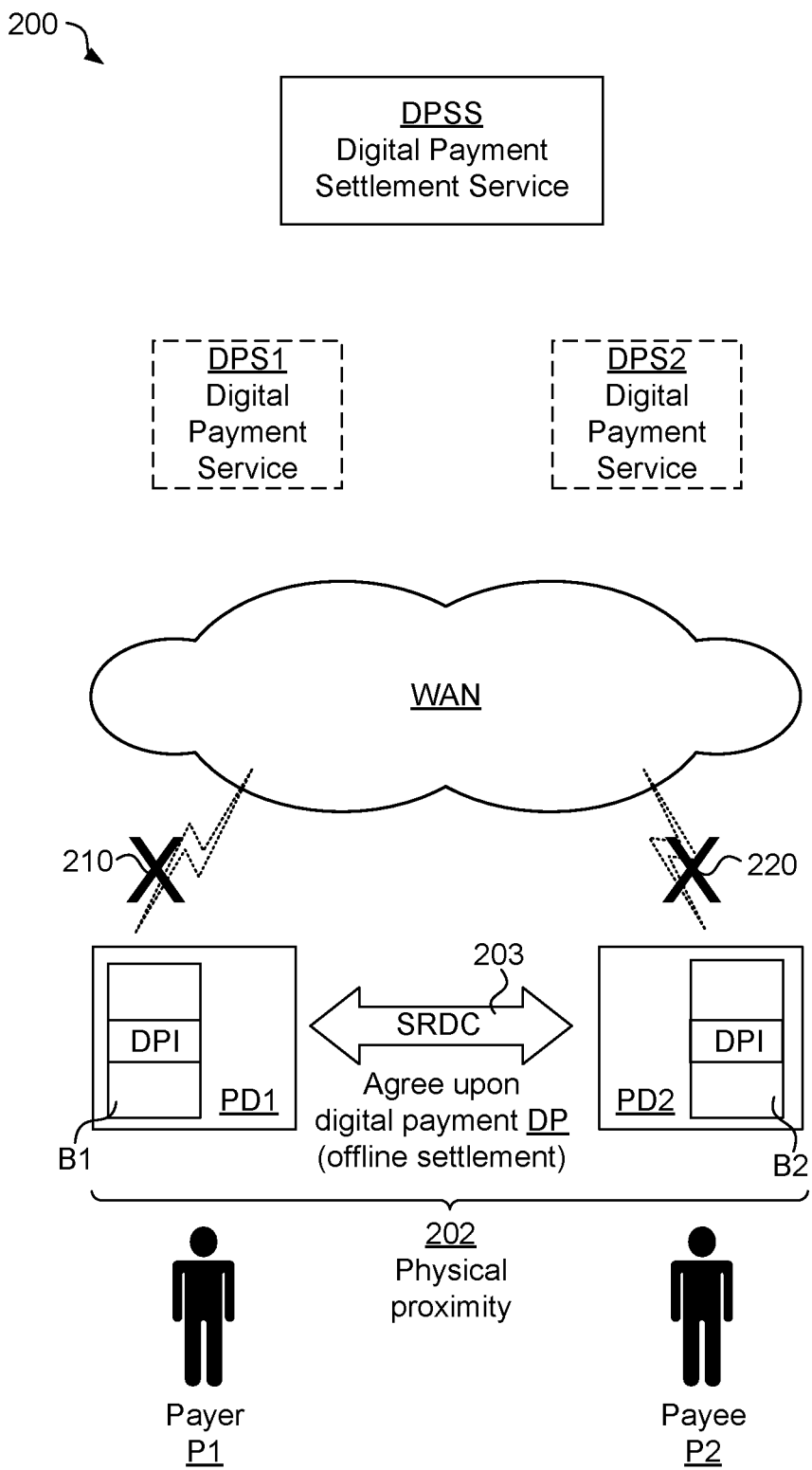
FIG. 2A is a schematic diagram of a communication system for handling digital proximity payments generally according to the present invention, even when neither of a payer communication device and a payee communication device are online, i.e. they both lack a momentary access to a cloud-based digital payment settlement service by wide-area network communication in a first stage of the handling of the digital payment by way of an offline settlement.

FIG. 2A illustrates a communication system 200 for handling digital proximity payments generally according to the present invention. The communication system 200 comprises a payee communication device PD1, a payer communication device PD2 and a cloud-based digital payment settlement service DPSS which is accessible by wide-area network, WAN, communication. Similar to what was described for the prior art systems 100, 100' in FIGS. 1A and 1B, a payer P1 wishes to make a digital payment to a payee P2, for instance in order to buy a product, enjoy a service, settle a debt, or gain access to something controlled by the payee P2. Accordingly, the payer P1 brings the payer communication device PD1 in proximity 202 of the payee communication device PD2 (or alternatively the other way around). The payer communication device PD1 can, for instance, be of any of the following exemplary types: a mobile communication device, a mobile phone, a smart phone, a tablet computer, a personal digital assistant, a portable computer, smart glasses, a smart card or a smart wearable (e.g. smart watch or smart bracelet). The payee communication device PD2 can, for instance, be of any of the exemplary types as referred to for the payer communication device PD1, or a payment terminal, a service terminal, a point-of-sales terminal, a checkout counter, a delivery pickup point, a vending machine, a ticket machine, a dispensing machine, or an access control system.

It is recalled that in the prior art systems 100, 100' in FIGS. 1A and 1B, at least one of the payer communication device PD1 and the payee communication device PD2 generally require online access to the digital payment settlement service DPSS by WAN communication at the moment of payment. In contrast, such online access to the digital payment settlement service DPSS will not be required for any of the payer and payee communication devices PD1, PD2 during a first stage of the payment procedure, which involves offline settlement by short-range data communication SRDC when the devices PD1 and PD2 are in proximity of each other to agree upon a digital payment DP. Such online access by either of the payer communication device PD1 and the payee communication device PD2 to the cloud-based digital payment settlement service DPSS will only be required at a subsequent second stage, which involves online settlement and occurs at a later moment in time.

Figure 2B:
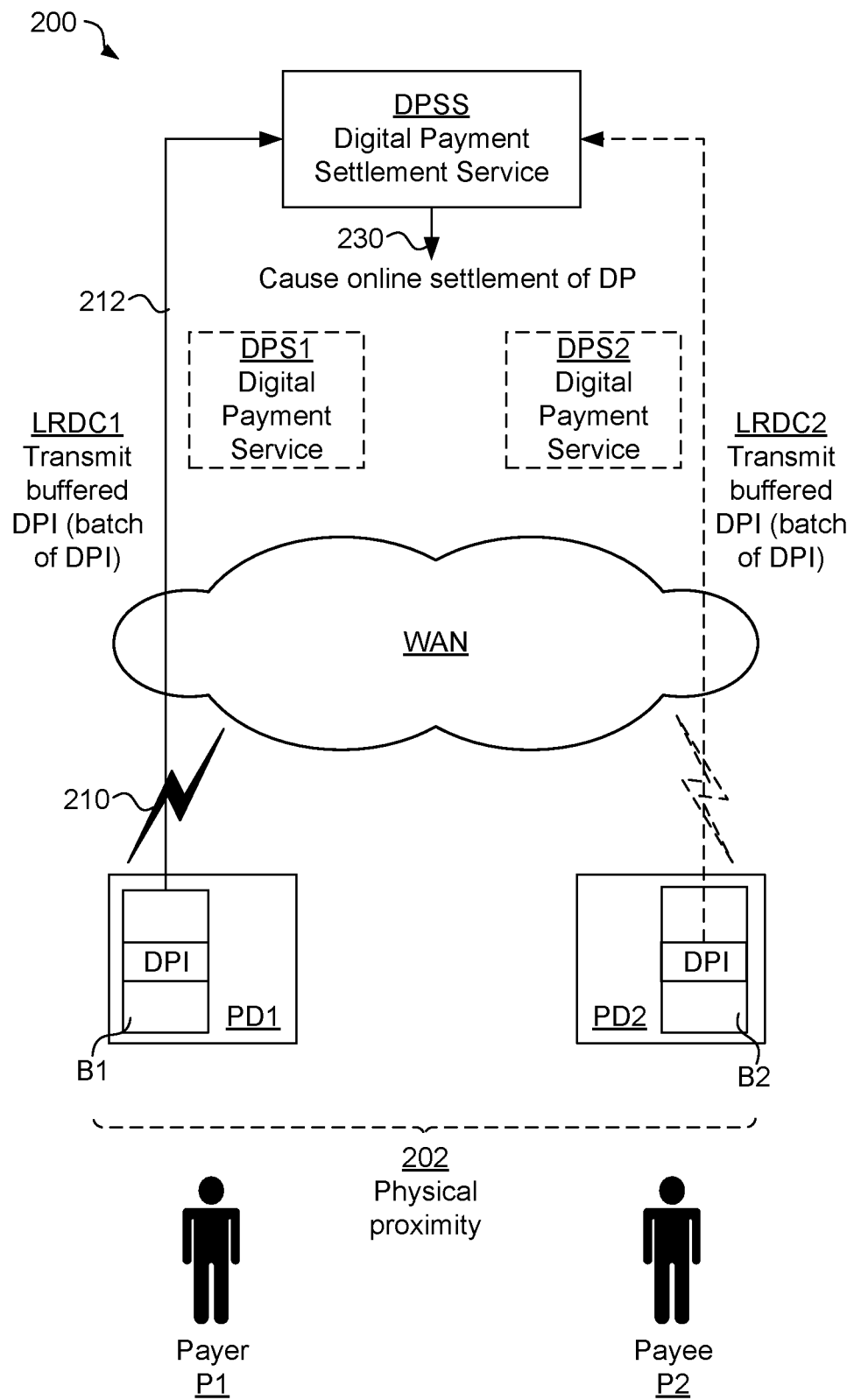
FIGS. 2B and 2C are schematic diagrams illustrating the communication system in FIG. 2A in a subsequent second stage of the handling of the digital payment, when either of the payer communication device and the payee communication device has become online, i.e. has (re)gained an ability to access a cloud-based digital payment settlement service by wide-area network communication, wherein an online settlement can take place.
Figure 2C:
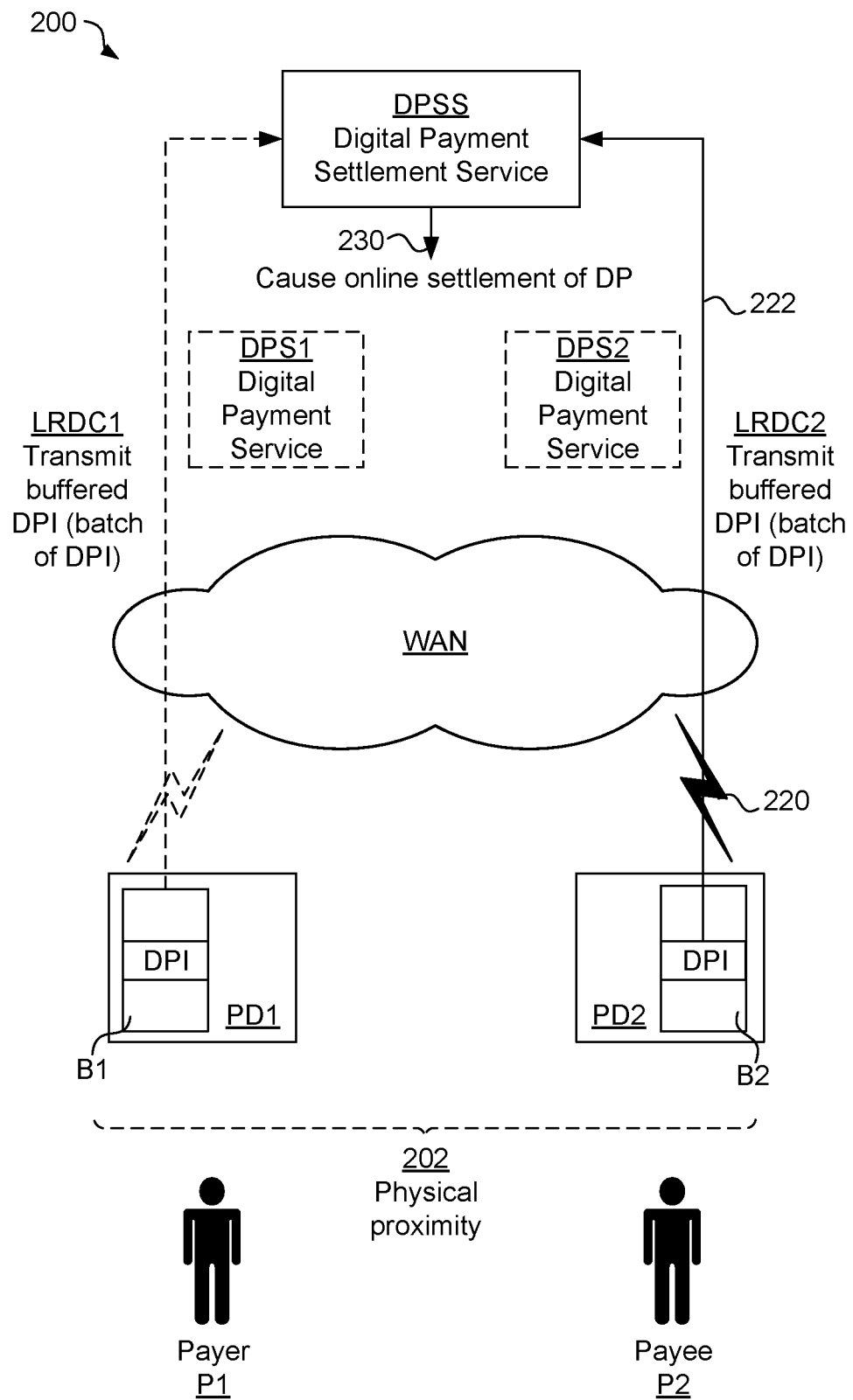

Hence, the digital payment DP can be performed irrespective of whether the payer communication device PD1 and the payee communication device PD2 lack momentary access to the digital payment settlement service DPSS by wide-area network communication in the first stage of the handling of the digital payment. It is recalled that such lack of access to the cloud-based digital payment settlement service DPSS can be due to the cloud-based digital payment settlement service DPSS being momentarily inoperative (this includes any of its constituent entities as well as any related entities in the cloud, such as online bank or clearing services), or because there is technical problem with the WAN communication as such. The second stage is illustrated in FIGS. 2B and 2C and serves to cause final online settlement of a digital payment transaction which transfers an economic value from an account associated with the payer user P1 (or with another entity represented by the payer user P1) to an account associated with the payee user P2 (or with another entity represented by the payee user P2, such as a merchant, shop owner, service provider, etc.). The accounts can be managed by the digital payment settlement service DPSS itself or alternatively by other entities, such as banks or other financial institutes.

The communication system 200 offers a robust solution that allows digital proximity payments to be performed also in situations that were not possible with the push or pull approaches in the prior art systems 100, 100' in FIGS. 1A and 1B. As the reader will note, those prior art approaches are based on the paradigm that one, and only one, of the payer (push) or payee (pull) shall handle the buffering and sending of digital payment transactions to the cloud for online settlement. In the inventive approach, on the other hand, with its two stages of offline and online settlement, both the payer and the payee are capable of buffering and sending digital payment transactions to the cloud for online settlement. Firstly, this will be beneficial to both parties since, as mentioned, digital proximity payments can be performed without requiring momentary online capabilities.

Secondly, the payee may benefit from being able to cause subsequent online settlement, since it will not have to wait for the payer side to do it and can therefore enjoy the online settlement quicker. Online settlement may thus advantageously be caused on the payee side when the payee communication device regains online capacity.

On the payer side, the ability to cause online settlement may be beneficial because it is the prevailing norm to settle push transactions online. It may also allow the payer's bank to verify the digital payments and, as a consequence, build trust and allow the payer to make a top-up of a local digital wallet in the payer communication device (a further description of the local digital wallet will follow below). Online settlement may be caused on the payer side when it regains online capacity, upon request from the payer's bank, according to a schedule, when a top-up is made of the local digital wallet, etc.

Figure 6:
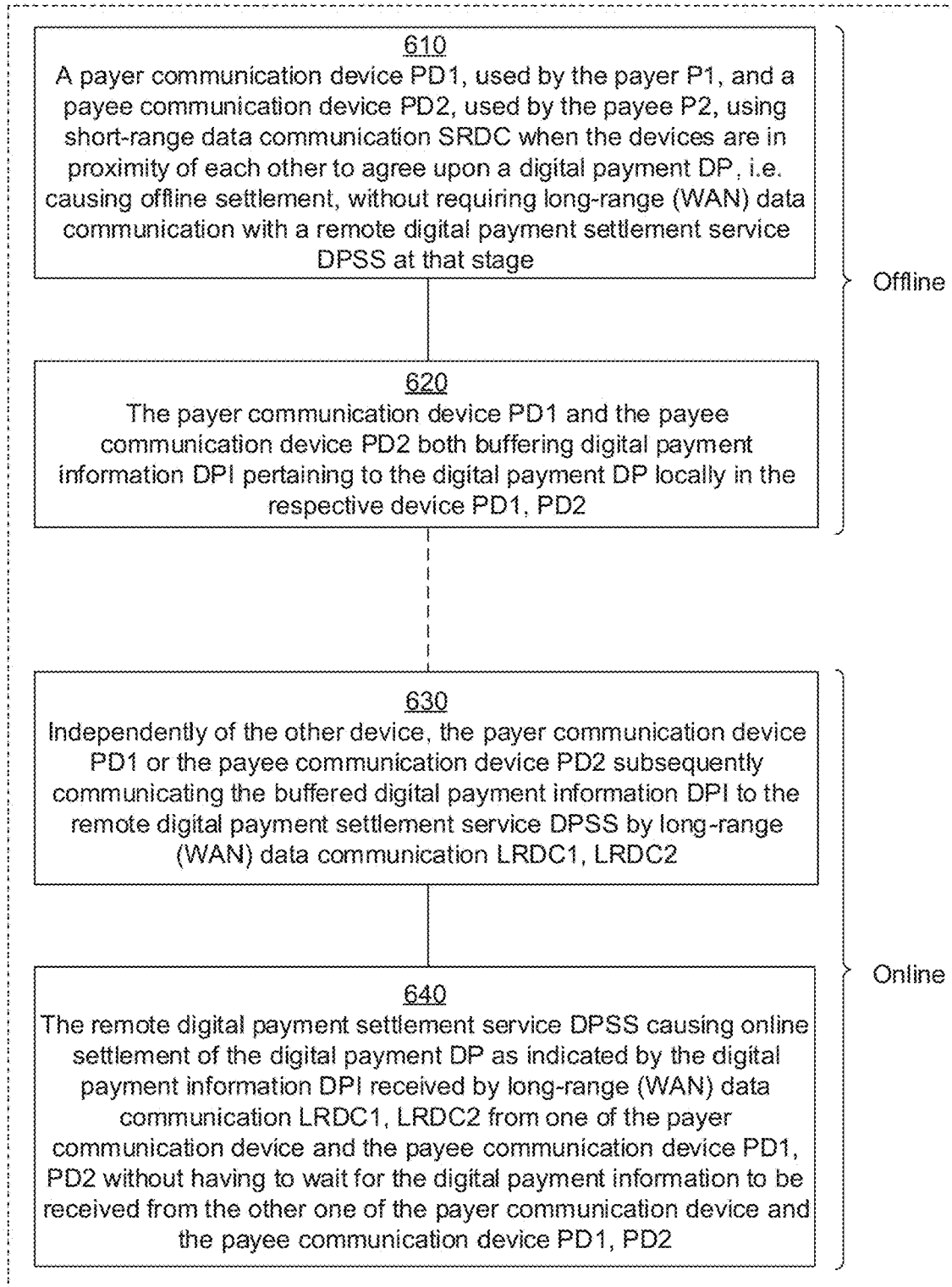
FIG. 6 is a schematic block diagram of a method for handling a digital payment between a payer P1 and a payee P2 generally according to the present invention, involving an offline settlement stage and a subsequent online settlement stage.

The communication system 200 in FIGS. 2A-2C is configured to perform a method 600 for handling a digital payment DP between the payer P1 and the payee P2. As can be seen in FIG. 6, the method 600 is divided into two stages, offline and online. The offline stage involves the following. At 610 in FIG. 6, the payer communication device PD1, used by the payer P1, and the payee communication device PD2, used by the payee P2, use short-range data communication SRDC at 203 when the devices PD1 and PD2 are in physical proximity (see 202 in FIG. 2A) of each other to agree upon a digital payment DP without requiring long-range (WAN, broadband) data communication with the remote digital payment settlement service DPSS during the offline stage. In effect, step 610 causes an offline settlement of the digital payment DP between the payer P1 and payee P2. At 620 in FIG. 6, the payer communication device PD1 and the payee communication device PD2 both buffer digital payment information DPI pertaining to the digital payment DP locally in the respective device PD1, PD2. See FIG. 2A, buffer B1 in the payer communication device PD1 and buffer B2 in the payee communication device PD2.

Note that neither of the payer and payee communication devices PD1, PD2 needs to make any WAN communication during the offline stage, as indicated at 210 and 220 in FIG. 2A. Hence, they can be seen as being offline with respect to the remote digital payment settlement service DPSS at this stage.

Then, the online stage will commence at some later moment in time. The online stage is illustrated in FIGS. 2B and 2C and involves the following functionality in the method 600 in FIG. 6. As can be seen at 630, the payer communication device PD1 or the payee communication device PD2, independently of the other device, communicates the buffered digital payment information DPI to the remote digital payment settlement service DPSS by long-range (WAN, broadband) data communication LRDC1, LRDC2.

In response, as seen at 640, the remote digital payment settlement service DPSS causes settlement 230 of the digital payment DP, as indicated by the digital payment information DPI received by the long-range data communication LRDC1, LRDC2 from one of the payer communication device and the payee communication device PD1, PD2, without having to wait for digital payment information to be received from the other one of the payer communication device and the payee communication device PD1, PD2. The online settlement may involve a digital payment service DPS1, being a bank or other financial institute having the payer P1 as a client, and a digital payment service DPS2, being a bank or other financial institute having the payee P2 as a client. If the payer P1 and payee P2 has the same bank or other financial institute, there may of course be just a single common digital payment service involved in the online settlement. In some embodiments, the digital payment settlement service DPSS also incorporates or implements the digital payment services DSP1, DPS2 or the single common digital payment service, as the case may be.

FIG. 2B illustrates a situation where the payer communication device PD1 communicates 212 its buffered digital payment information DPI, as stored in the local buffer B1, to the remote digital payment settlement service DPSS by long-range data communication 210, LRDC1. The digital payment settlement service DPSS does not have to wait for the digital payment information DPI to be received from the payee communication device PD2 but can proceed directly with the settlement 230 of the digital payment DP. FIG. 2C illustrates the opposite situation. Note that proximity 202 between the payer communication device PD1 and payee communication device PD2 is no longer required in the online stage of FIG. 2B or 2C, as indicated by hatched lines.

Advantageous embodiments involves the provision of a local digital wallet in the payer communication device PD1 as follows. As additional initial steps, the method 600 further involves that the payer communication device PD1 retrieves a credit amount from the digital payment service DPS1 by long-range data communication. The payer communication device PD1 enters the credit amount in a local digital wallet maintained by the payer communication device PD1. Prior to agreeing 610 upon the digital payment DP with the payee communication device PD2, the payer communication device PD1 checks whether the local digital wallet has sufficient balance for the digital payment DP. Sufficient balance will typically mean that a current balance of the local digital wallet is at least as large as the amount of the digital payment. Only when the local digital wallet has sufficient balance for the digital payment DP will an amount of the digital payment DP be deducted from the local digital wallet, thus agreeing 610 upon the digital payment DP and proceeding with the remaining steps of the method 600.

The term "local digital wallet" implies no restriction to any particular implementation. The term is to be construed broadly to mean a local digital balance, or local credit, expressed in any unit of value (such as, without limitation, a monetary state currency or digital currency), and managed locally by the payer communication device PD1 for the purpose of allowing the user P1 thereof to perform a digital payment as referred to in this document in an amount which does not exceed the current digital balance, and from which the payment amount is deducted so that the current digital balance is reduced accordingly.

In some embodiments, the user P1 of the payment communication device PD1 can set a desired credit level for the local digital wallet (local digital balance, local credit). The payment communication device PD1 may be configured, when it has WAN access, to automatically request a replenishment credit amount from the digital payment service DPS1 by long-range data communication, wherein the replenishment credit amount will correspond to a difference between the desired credit level and the current balance of the local digital wallet, so that the balance of the local digital wallet is topped up to the desired credit level. Conversely, if the current balance of the local digital wallet exceeds the desired credit level (for instance because the user P1 has received one or more digital payments in his or her capacity as a payee), the excess amount may be transferred from the local digital wallet to the digital payment service DPS1, such that the local digital wallet is kept at the desired credit level.

It is to be noted that the provision of a local digital wallet in the payer communication device PD1 may be used by the payer P1 also to make a payment to a payment receiver (payee) who is not proximate to the payer P1, e.g. by making a cloud-based payment transaction by long-range data communication with the remote digital payment settlement service DPSS (or a digital payment service DPS1, DPS2 as is seen in FIGS. 2B and 2C), for an amount covered by the current balance of the local digital wallet.

Some embodiments involve the payee device communication PD2 using the buffered digital payment information DPI to allow the payee P2 of the payee communication device PD2 to act as a payment sender (i.e., payer) of another payment to another payment receiver (i.e. payee) by transferring the buffered digital payment information DPI to another communication device used by said another payment receiver.

If such another payment receiver is proximate to the payee P2, the payment may be handled in the same way as has been described for the method 600 above. On the other hand, if such another payment receiver is not proximate to the payee P2, the payment may be handled by the payee communication device P2 making a conventional cloud-based payment transaction by long-range data communication with the remote digital payment settlement service DPSS or a digital payment service DPS1, DPS2.

Before turning to a detailed description of the advantageous embodiments which are disclosed in FIGS. 3A-B, 4A-B and 5A-C, some other interesting features of embodiments of the invention will be described on a general level.

One such interesting feature is the ability to generate a digital payment which during the offline stage is perceived by the payee PD2 as a guaranteed or safe payment transaction. In turn, this will allow the payee PD2 to trust that he or she can perform goods or services, even though the digital payment has not yet been settled online by the remote digital payment settlement service DPSS in the cloud. To achieve this, the communication device PD1 and the payee communication device PD2 may arrive at the aforementioned agreement 610 upon the digital payment DP (i.e., offline settlement) by performing the following short-range data communication-based activity.

First, the payee communication device PD2 transmits payment details for the digital payment DP to the payer communication device PD2 by short-range data communication SRDC. See for instance 334 in the embodiment of FIG. 3A; other embodiments are also possible.

Figure 3A:
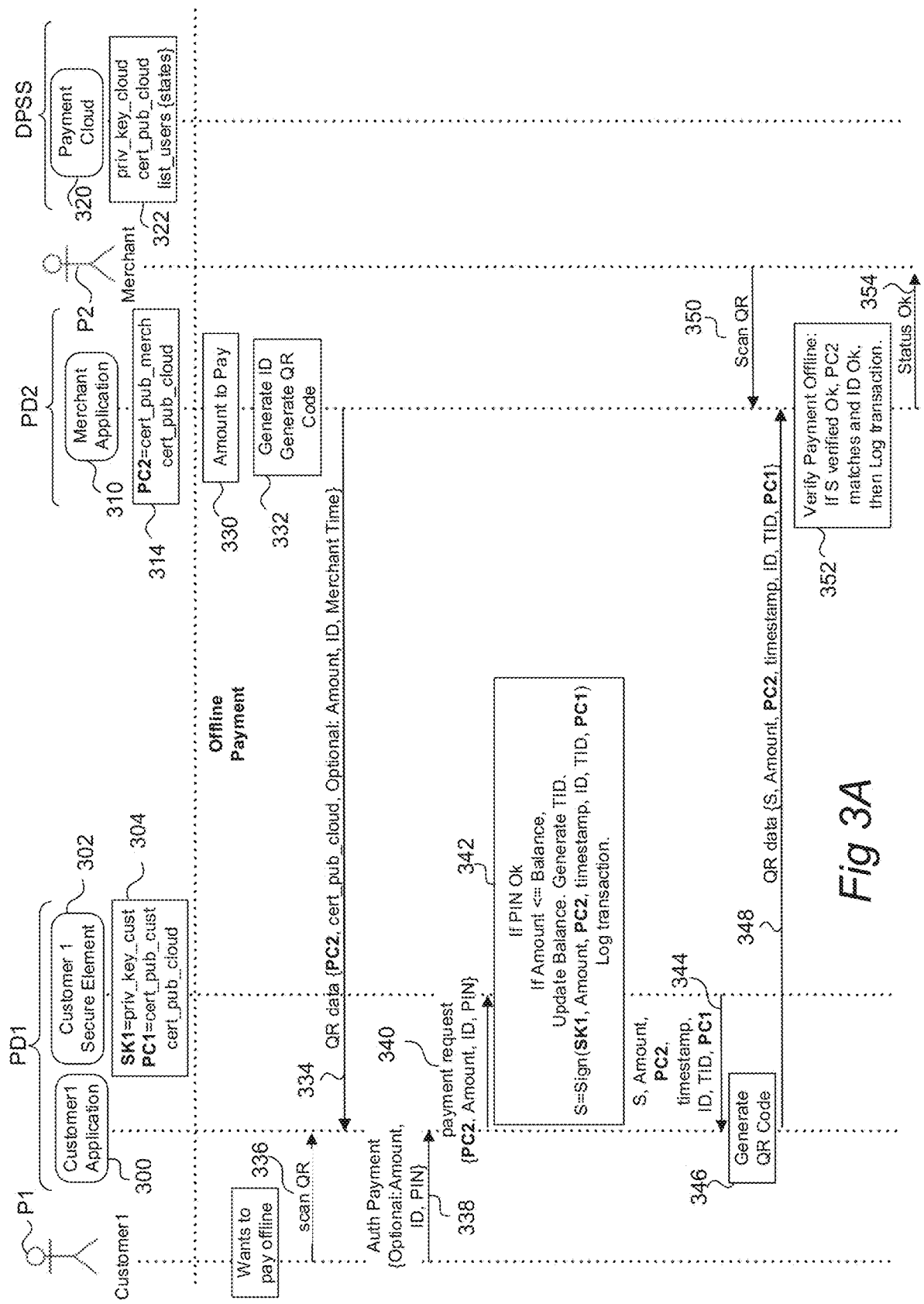
FIGS. 3A and 3B illustrate a schematic diagram of a communication system for handling digital proximity payments according to a first beneficial embodiment of the present invention, where the payer communication device has an application and a secure element for performing the payer communication device's part of the digital payment functionality.

The payer communication device PD1 uses the payment details and a digital signature of the payer P1 to digitally sign (see 342 in FIG. 3A) the digital payment DP and generate a payment token (see S in FIG. 3A).

The payer communication device PD1 then transmits 348 the payment token S to the payee communication device PD2 by short-range data communication SRDC, and the payee communication device PD2 buffers 352 the received payment token S in or as said digital payment information DPI locally in the payee communication device PD2. We will revert to the benefits of such an approach when describing the embodiments of FIGS. 3A-B, 4A-B and 5A-C.

Another interesting feature is the ability for the communication system 200 to make beneficial use of the buffers B1 and B2 to allow online payment settlement by batch processing. In addition to storing the digital payment information DPI in the buffer B1 or B2 during the offline stage (see FIG. 2A) of the handling of a present digital payment DP, each of the payer communication device PD1 and the payee communication device PD2 may buffer also digital payment information for previous digital payments that they have agreed upon in the corresponding manner as described above for the handling of a present digital payment DP, with each other or with other payees and payers, respectively. The digital payment information for such previous digital payments may also be stored in the buffers B1 and B2, respectively.

Subsequently, each of the payer communication device PD1 and the payee communication device PD2 will communicate a batch of such buffered digital payment information to the remote digital payment settlement service DPSS by long-range data communication LRDC1, LRDC2, wherein the batch includes the present digital payment DP as well as the previously buffered digital payments. Such communication of buffered digital payment information can be seen at 212 in FIG. 2B, at 222 in FIG. 2C, at 360 and 370 in FIG. 3B, and at 560 and 570 in FIG. 5B.

The remote digital payment settlement service DPSS will then receive the batch of buffered digital payment information as sent by the payer communication device PD1 or the payee communication device PD2 (whichever occurs first), and process each digital payment contained in the batch to cause settlement thereof, unless not already settled by another entity.

In some embodiments, the payment settlement caused by the digital payment settlement service DPSS may involve instructing a digital payment service DPS1 associated with the payer P1 to transfer funds from an account held by the payer P1 to a digital payment service DPS2 associated with the payee P2, to be credited to an account held by the payee P2. Alternatively, the payment settlement caused by the digital payment settlement service DPSS may involve instructing a digital payment service DPS2 associated with the payee P2 to collect funds from an account held by the payer P1 at a digital payment service DPS1 associated with the payer P1. The digital payment service DPS1 may be the same as the payment service DPS2 in some embodiments. Moreover, in some embodiments, the payment settlement caused by the digital payment settlement service DPSS does not involve a separate digital payment service DPS1 and/or DPS2 (i.e., the digital payment settlement service DPSS itself controls the account of the payer P1 and/or of the payee P2).

As will be clear from the description above, the present invention performs digital payments in a two-stage procedure as outlined above in FIG. 2A (first stage, local offline payment involving only short-range data communication SRDC) and in FIGS. 2B/2C (second stage, subsequent online payment settlement involving long-range data communication LRDC1/LRDC2). This has several advantages, as has already been described above. An additional advantage is the elimination or at least reduction of the need for long-range data communication with cloud-based resources to check that the payer has sufficient coverage for the payment amount at the moment when the payment is to be agreed upon between payer and payee (cf. step 610 in the first stage of the present invention). In the present invention, it normally suffices to make a local check against a current balance of a local digital wallet in the payer communication device. This will not require long-range data communication and will thus both save communication bandwidth and enable a faster payment procedure.

Advantageously, the offline payment functionality provided by the present invention may be applied irrespective of whether the payer and payee communication devices PD1, PD2 are offline or online at the time when the digital payment is agreed upon.

This will mean that that the functionality described above (i.e. the payer communication device PD1 and the payee communication device PD2 both buffering digital payment information DPI pertaining to the digital payment DP locally in the respective device PD1, PD2 in the first stage (FIG. 2A; step 620 in FIG. 6), and the payer communication device PD1 and/or the payee communication device PD2 subsequently communicating the buffered digital payment information DPI to the remote digital payment settlement service DPSS by long-range data communication LRDC1, LRDC2 in the second stage (FIG. 2B/2C; step 630 in FIG. 6), will be performed even if one or both of the devices PD1, PD2 actually would have had online access to the digital payment settlement service DPSS by WAN communication in step 610. The time between performing the first stage and performing the second stage may be quite short, or even very short, if at least one of the devices PD1, PD2 already had WAN access (i.e. was not offline) when the digital payment was agreed upon at 610 in the first stage of the payment procedure. Hence, it may be beneficial to always apply the two-stage payment procedure as provided by the present invention, for instance in order to obtain any of the advantages referred to previously in this document. Moreover, by applying the two-stage payment procedure by default, the present invention will represent a full-service payment solution which may remove the need for existing, conventional online payment solutions for digital payments between proximate payers and payees.

The above notwithstanding, in case the local digital wallet of the payer P1 has insufficient balance, online communication may be used either to perform a conventional push or pull transaction, or to make a top-up of the local digital wallet.

In alternative embodiments, the use of the two-stage procedure (e.g. the method 600 in FIG. 6) may be limited to situations where at least one of the payer P1/payer communication device PD1 and the payee P2/payee communication device PD2 is offline at the time when the digital payment is agreed upon. If one or both of the devices PD1 and PD2 do have online access to the digital payment settlement service DPSS by WAN communication at the time when the digital payment is agreed upon, a conventional online payment may be performed by one or both of the devices PD1, PD2 directly communicating with the digital payment settlement service DPSS (or alternatively the digital payment service DPS1, DPS2) by long-range data communication LRDC1, LRDC2.

This will mean that the functionality described above (i.e. the payer communication device PD1 and the payee communication device PD2 both buffering digital payment information DPI pertaining to the digital payment DP locally in the respective device PD1, PD2 in a first stage (FIG. 2A; step 620 in FIG. 6), and the payer communication device PD1 and/or the payee communication device PD2 subsequently communicating the buffered digital payment information DPI to the remote digital payment settlement service DPSS by long-range data communication LRDC1, LRDC2 in a second stage (FIG. 2B/2C; step 630 in FIG. 6) will only be performed when both devices PD1 and PD2 are offline at the time of the first stage. Otherwise, the first and second-stage functionality will not be performed, and instead conventional online payment may be applied. This alternative approach will be beneficial in that the offline payment functionality provided by the present invention may be implemented as an add-on to existing functionality for conventional online digital payments between proximate payers and payees.

Yet another interesting feature has to do with personal integrity. As has been described above, in embodiments of the present invention the payer P1 digitally signs the digital payment DP during the first stage of the payment procedure, i.e. when the payer communication device PD1 and the payee communication device PD2 agree upon the digital payment DP by short-range data communication SRDC without requiring long-range data communication with the remote digital payment settlement service DPSS at that stage. However, this does not mean that the identity of the payer P1 will have to be revealed to the payee P2, nor to the payee's bank. Conversely, the identity of the payee P2 will not have to be revealed to the payer P1, nor to the payer's bank. As the skilled person will realize, applying a digital signature may allow the remote digital payment settlement service DPSS to verify the authenticity of the digital payment DP and identify it as being made by the payer P1. In advantageous embodiments, the identity of the payer P1 is known only to the digital payment settlement service DPSS but not to the digital payment service DPS2 (the payee's bank) that manages the account that receives the payment amount at the online settlement. Hence, neither the payee P2 nor the payee's bank can or has to be able to determine the identity of the payer P1. Sufficient trust can be built into the system thanks to the use of peer certificates for the payer P1 and payee P2 (cf. PC1 and PC2 in FIGS. 3A and 5A), wherein these peer certificates in turn are signed and guaranteed by the digital payment settlement service DPSS (or another trusted entity, such as a central bank) (cf. cert_pub_cloud in FIGS. 3A and 5A). The peer certificates as such do not have to contain information that reveals the true identity of the payer P1 or payee P2. The identities exchanged in the communication of digital payment details between P1 and P2 can be virtual logic handles to the real identities that may be stored only at the digital payment settlement service DPSS (and possibly another trusted entity, e.g. a central bank). Accordingly, both the end users P1 and P2 and their banks DPS1, DPS2 can put trust in the system, without necessarily having to know the actual identities of the other party to the digital payment.

In some embodiments, the payee may use the digital payment, being digitally signed by and received from the payer P1, as anonymous digital currency. The payee's possession of the digitally signed digital currency will as such be sufficient for him or her to use as a value object in a further electronic transaction. This is beneficial since it will allow digital payments pursuant to the present invention to be used much like traditional cash money which does not carry an indication of the identity of the present owner (i.e. payer).

The advantageous embodiments represented by FIGS. 3A-3B, 4A-4B and 5A-5C will now be described in more detail.

Figure 3B:
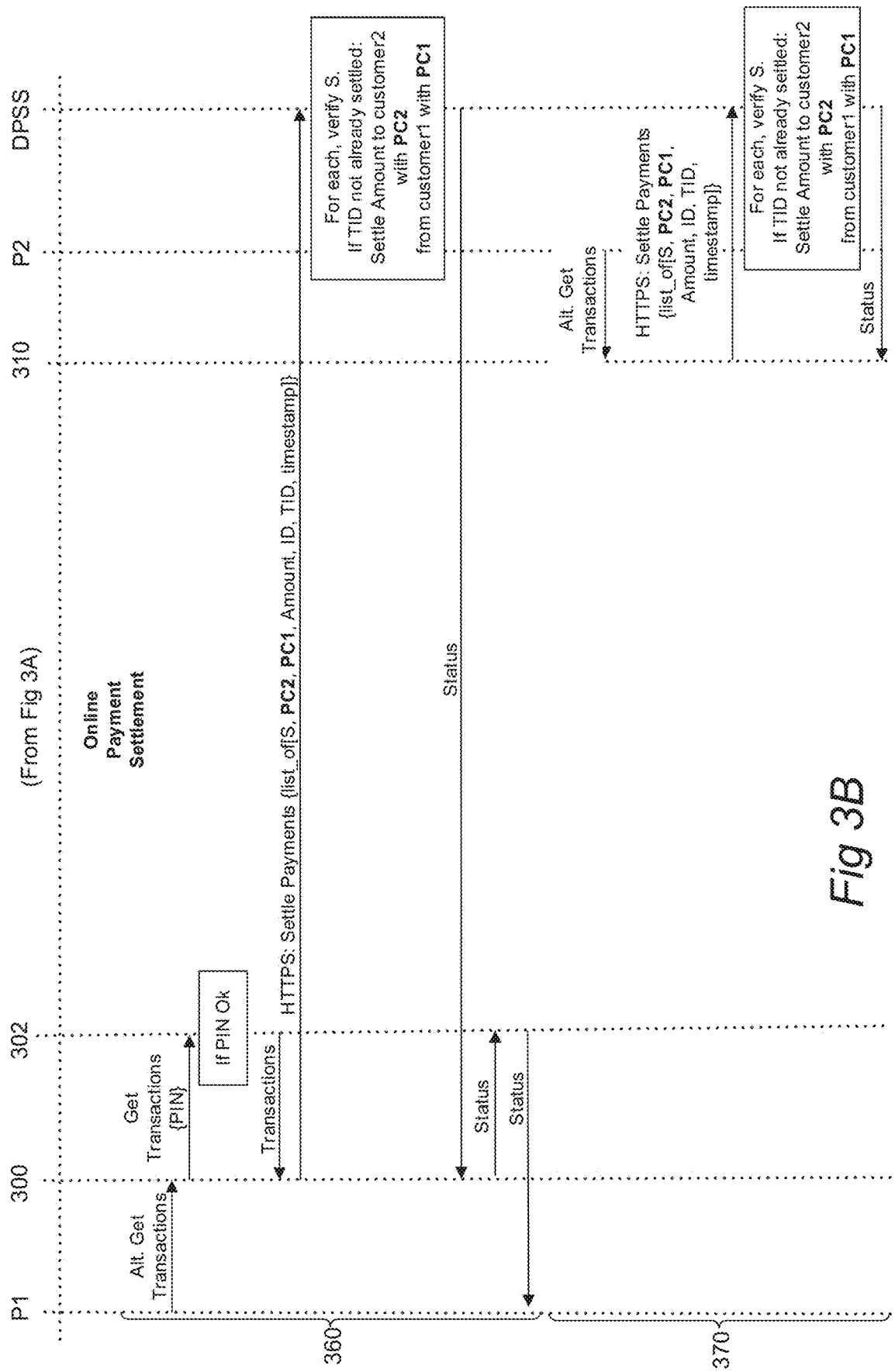

FIGS. 3A-3B disclose a sophisticated embodiment of a communication system and a method for handling digital payments according to the present disclosure. It is recalled that the communication system comprises a first communication device in the form of a payer communication device PD1, a second communication device in the form of a payee communication device PD2 and a digital payment settlement service DPSS (or alternatively another form of cloud-based payment functionality). The system and method can be used for handling a digital payment between a payer P1, such as a customer or a first peer, and a payee P2, such as a merchant or a second peer, as previously explained.

In the embodiment of FIGS. 3A-3B, the payer communication device PD1 comprises an application 300 and a secure element 302. As regards the notion "secure element", the skilled reader will know that this notion refers to a tamper-resistant hardware or virtual (software-based) computing platform, capable of securely hosting applications and storing confidential and cryptographic data. The secure element 302 may, for instance, be implemented by element 754 in FIG. 7.

As can be seen at 304, the secure element 302 stores a private cryptographic key SK1 for the payer communication device PD1 (or payer P1), a digital certificate PC1 for the payer communication device PD1 (or payer P1) and a digital certificate cert_pub_cloud for the digital payment settlement service DPSS. The digital certificates may, for instance, be DER-encoded X.509-based certificates. The digital certificate PC1 comprises a public cryptographic key for the payer communication device PD1 (or payer P1). Likewise, the digital certificate cert_pub_cloud comprises a public cryptographic key for the digital payment settlement service DPSS.

The payee communication device PD2 comprises an application 310 that has access 314 to a digital certificate PC2 for the payee communication device PD2 (or payee P2) and the digital certificate cert_pub_cloud for the digital payment settlement service DPSS.

The digital payment settlement service DPSS is referred to as "Payment Cloud" 320 in FIG. 3A and has access to the digital certificate cert_pub_cloud as well as a private cryptographic key priv_key_cloud for the digital payment settlement service DPSS, the private cryptographic key being associated with the public cryptographic key for the digital payment settlement service DPSS, as is well-known per se. The digital payment settlement service DPSS further has access to information list_users of the users in the system, including the payer P1 and the payee P2. This is seen at 322.

When the payer P1 wishes to make an offline digital payment to the payee P2 in the embodiment of FIGS. 3A-3B, the following activity takes place. It is recalled from the description of the previous embodiments that the payer communication device PD1 and the payee communication device PD2 use short-range data communication when the devices are in proximity of each other to agree upon the offline digital payment without requiring long-range data communication with the remote digital payment settlement service DPSS at that stage. In the embodiment of FIGS. 3A-3B, the short-range data communication takes place by exchange of optical code data, such as presentation and scanning/reading of QR codes (or barcodes), in both directions between the devices PD1, PD2. This is considered as beneficial for ease of implementation. However, other alternatives for short-range data communication are also fully possible, including short-range wireless RF communication (such as Bluetooth, BLE, RFID, WLAN, WiFi, mesh communication, or another form of proximity-based device-to-device radio communication signal such as LTE Direct), NFC, audio communication or ultrasound communication, in either or both ways of communication between PD1 and PD2.

The payee communication device PD2 establishes an amount to be paid, see 330. As seen at 332, it also generates an ID for the upcoming payment transaction and a QR code that comprises certain QR data. As seen at 334, the QR data comprises the digital certificate PC2, the digital certificate cert_pub_cloud, optionally the amount to be paid, and the generated ID.

The payer P1 user the payer communication device PD1 to scan the QR code. This allows the application 300 to retrieve the QR data, as seen at 336. The payer P1 may authorize the amount to the paid by an affirmative action, such as the entry of a PIN, biometric data, etc., at 338. If the amount was included in the QR data, the application 300 may present it on a display screen of the payer communication device PD1 to the payer P1. If the amount to be paid was not included in the QR data, then the payer P1 may be informed of it in another suitable manner, such as by the payee P2 telling him, or the amount being presented on a display screen comprised in or operatively associated with the payee communication device PD2.

In response to the authorization at 338 by the payer P1, the application 300 sends a payment request to the secure element 302 at 340.

The secure element 302 proceeds to verify the authorization (e.g. checking that the PIN is correct). The secure element 302 also checks that the current balance of the local digital wallet in the payer communication device PD1 is sufficient to cover the amount to be paid.

If these checks pass, the secure element 302 updates the balance of the local digital wallet by deducting the amount (i.e. the updated balance is obtained by subtracting the amount to be paid from the current balance). The secure element 302 moreover generates a transaction ID referred to as TID. The secure element 302 then generates a dataset S by signing the following data with the private cryptographic key SK1: the amount to be paid, the digital certificate PC2 received from the payee communication device PD2 (or, in some embodiments, merely the public cryptographic key in the digital certificate PC2), a timestamp, the ID received from the payee communication device PD2, and the digital certificate PC1 for the payer communication device PD1 (or payer P1). In embodiments, the timestamp may originate from the payee device PD2 and thus be included in the QR data received by PD1 at 334. The dataset S constitutes a payment token.

The secure element 302 also logs the payment transaction (cf. the buffering of digital payment information DPI in a local buffer B1 as described previously in this document). This may involve storing the following digital payment information in a list in the secure element 302: S, amount, PC2, timestamp, ID, TID, PC1. The same data is then also returned by the secure element 302 to the application 300, as seen at 344. In some embodiments, the list could alternatively be maintained by the application 300 rather than the secure element 302.

At 346, the application 300 uses the received data (the digital payment information) as QR data to generate a QR code. The application 300 communicates the QR data at 348 to the payee communication device PD2, for instance by presenting the QR code that represents the QR data on a display screen of the payer communication device PD1.

The application 310 in the payee communication device PD2 scans the QR code at 350 in order to retrieve the QR data, i.e. the digital payment information. In step 352, the application 310 first verifies the certificate PC1 in the retrieved QR data by using the digital certificate cert_pub_cloud. If this verification is successful, the application 310 verifies S by using PC1. The application 310 also compares the ID in the retrieved QR data with the ID generated in step 332 to verify that they are the same. Moreover, the payee communication device PD2 checks that it is the correct payment receiver by verifying that the received payment token S comprises the digital certificate PC2 (or the public cryptographic key) of the payee communication device PD2.

If all these verifications pass, the payee communication device PD2 can accept the digital payment DP. Accordingly, the application 310 logs the payment transaction (cf. the buffering of digital payment information DPI in a local buffer B2 as described previously in this document). This may involve storing the following digital payment information in a list in the application 310 or another local storage in the payee communication device PD2: S, amount, PC2, timestamp, ID, TID, and PC1. The reader will notice that the same data (digital payment information) is stored (logged) in the payee communication device PD2 by the application 310 as was stored (logged) in the payer communication device PD1 by the secure element 302.

The application 310 may then provide an OK status at 354 to the payee P2, for instance by providing a positive feedback in a user interface of the payee communication device PD2. Having received the OK status, the payee P2 may proceed with the action that is the subject of the payment, e.g. handing over a purchased product or performing a purchased service.

Either of the payer communication device PD1 and payee communication device PD2 may then, independently of the other device, subsequently communicate the logged (buffered) digital payment information to the remote digital payment settlement service DPSS by long-range data communication (c.f. LRDC1, LRDC2 in the previous drawings). This is seen as an online payment settlement procedure at 360 for the payer communication device PD1 and at 370 for the payee communication device PD2.

The online payment settlement procedure 360 involves the following. Triggered by the payer P1 or the application 300, and possibly subject to an authentication (e.g. PIN) by the payer P1, the secure element 302 retrieves the buffered payment transaction (or list of payment transactions, as the case may be) and communicates the retrieved data to the application 300. The application 300 communicates the retrieved data to the remote digital payment settlement service DPSS by long-range data communication, such as HTTPS.

The digital payment settlement service DPSS proceeds to process the payment transaction (or each transaction in the list, as the case may be) in the received data by checking the TID to verify that the particular transaction has not already been settled (e.g. by the payee communication device PD2, or by the payer communication device PD1 in a prior execution of the online payment settlement procedure 360). If the check passes, the digital payment settlement service DPSS causes settlement of the payment to cause an effective transfer of funds corresponding to the payment amount from the payer P1 to the payee P2, thereby involving a suitable payment service, credit card service, bank service, etc. To this end, the digital payment settlement service DPSS may identify the payer P1 from the digital certificate PC1 in the received data, and the payee P2 from the received digital certificate PC2. The digital payment settlement service DPSS may conclude by providing an affirmative status to the application 300, that may forward it to the secure element 302 and the payer P1.

The online payment settlement procedure 370 which is performable between the payee communication device PD2 and the digital payment settlement service DPSS may involve the corresponding functionality.

Figure 4A:
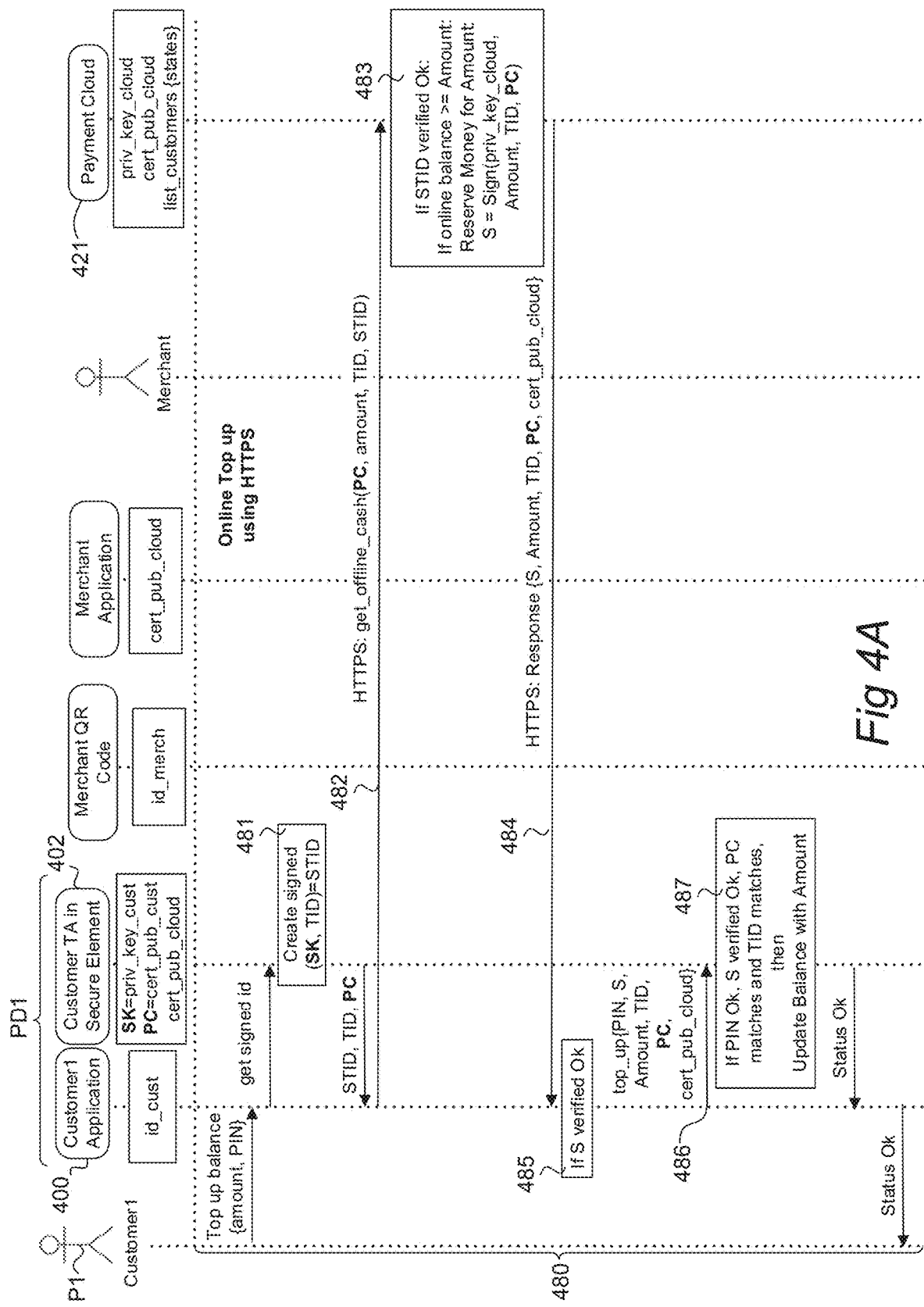
FIG. 4A discloses a first procedure for adding local digital cash to the payer communication device in FIGS. 3A and 3B (i.e., increasing the balance of the local digital wallet therein), using long-range data communication with a cloud-based digital payment service.
Figure 4B:
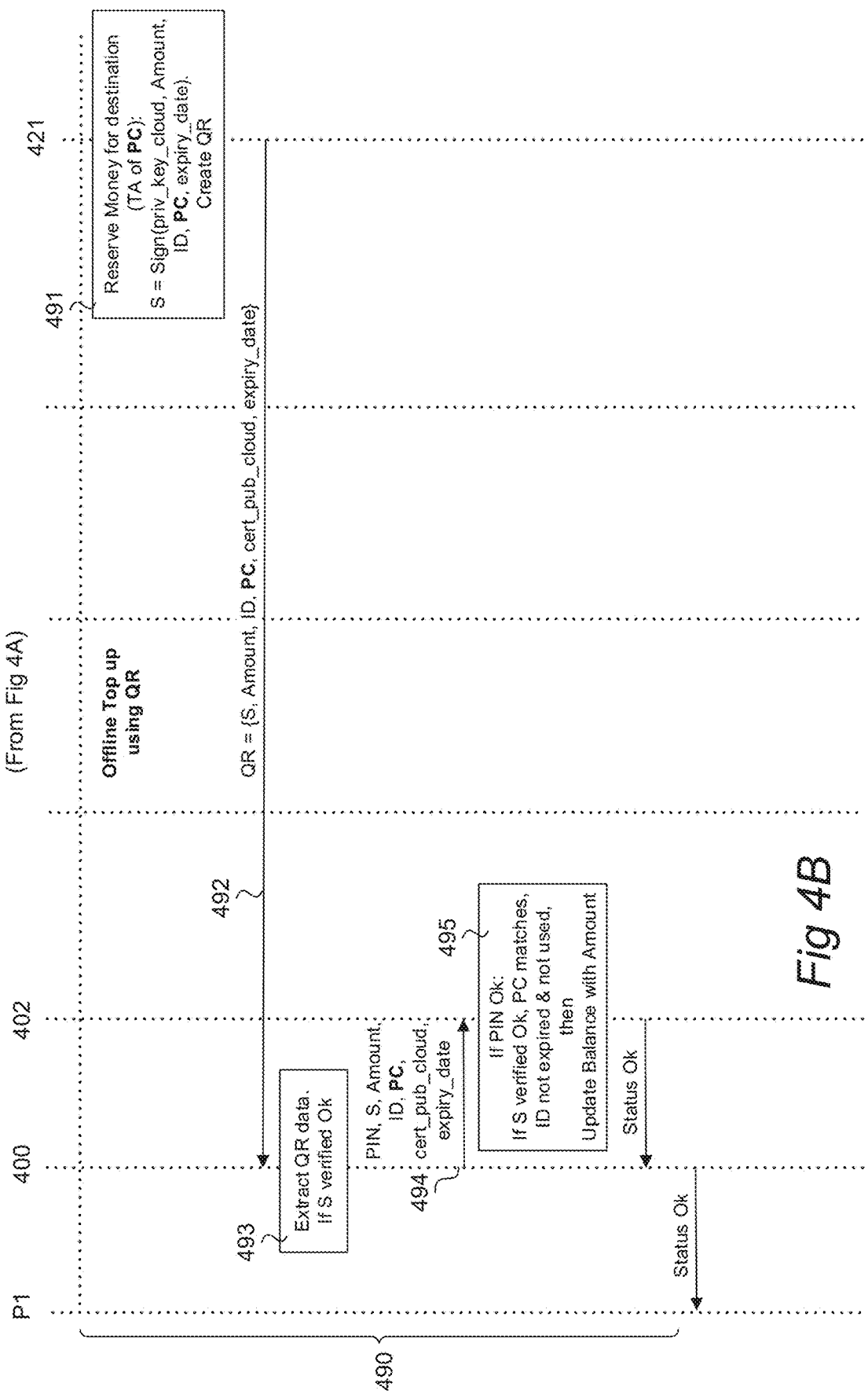
FIG. 4B discloses a second procedure for adding local digital cash to the payer communication device in FIGS. 3A and 3B, by scanning a QR code which is generated by the cloud-based digital payment service and is provided to the payer by way of physical transport (such as postal mail delivery) or through an ATM.

FIGS. 4A and 4B discloses procedures 480, 490 for adding local digital cash in the payer communication device PD1 (i.e., increasing the balance of the local digital wallet therein). This may occur either as an online cash replenishing procedure 480 using long-range data communication with a cloud-based digital cash service 421 (which may typically be the aforementioned DPSS and/or DPS1), or as an offline cash receiving procedure 490 that involves scanning a QR code generated by the cloud-based digital payment service 421.

A typical use of the online procedure 480 is when the individual P1 makes a request for a local digital cash top-up to the cloud-based digital cash service 421, asking for a withdrawal of cash from a bank account, payment service account or credit card held by the individual P1 and a transfer of those cash in digital form to the secure element 402 in the payer communication device PD1. The cash thus transferred is added to the local digital wallet by accordingly increasing the balance kept by the secure element 402.

As can be seen in FIG. 4A, and similar to FIGS. 3A and 3B, the payer communication device PD1 comprises an application 400 and a secure element 402. The secure element 402 stores a private cryptographic key SK for the payer communication device PD1 (or payer P1), a digital certificate PC for the payer communication device PD1 (or payer P1) and a digital certificate cert_pub_cloud for the cloud-based digital cash service 421. The digital certificate PC comprises a public cryptographic key for the payer communication device PD1 (or payer P1). Likewise, the digital certificate cert_pub_cloud comprises a public cryptographic key for the digital cash service 421.

The top-up activity in FIG. 4A involves the following steps. At 481, the secure element 402 receives a request through the application 400 from the payer P1 (or automatically generated by the application 400) to top-up the balance of the local digital wallet, generates a top-up transaction identifier TID, signs it as STID using the private cryptographic key SK, and returns the data to the application 400.

The application 400 sends a digital cash retrieval request 482 by long-range (WAN) communication to the cloud-based digital cash service 421. The request 482 contains the digital certificate PC, the requested top-up amount, TID and STID. Including PC in the digital cash retrieval request 482 will allow the requested top-up to be addressed specifically to the payer P1.

At 483, the digital cash service 421 first verifies STID by using PC, and then verifies that the requested amount can be admitted (e.g. that a current online balance or credit level of the payer's P1 account at least meets the requested amount). If these verifications are successful, the digital cash service 421 generates a signed data set S as a top-up token using a private cryptographic key for the digital cash service 421.

The top-up token S contains the admitted top-up amount (which may be equal to or less than the requested amount), TID and PC, and is sent at 484 together with the admitted top-up amount, TID, PC and cert_pub_cloud as clear-text to the application 400 by long-range (WAN) communication. The application 400 verifies S at 485 using the digital certificate cert_pub_cloud. Once verified, the application 400 sends a top-up instruction at 486 to the secure element 402. The top-up instruction 486 includes a PIN (previously entered by the payer P1) as well as the data received at 484.

At 487, the secure element 402 verifies the PIN, S, PC and TID, and then updates the balance of the local digital wallet by adding the admitted top-up amount.

A typical use of the offline procedure 490 is when the individual P1 receives an amount of digital cash without having made a request for it and without having to pay for it by debiting an account or credit card. Exemplifying situations include a social security payment (e.g. child support) from the government to the individual P1, governmental support to citizens in times of crisis, or a refund, reward or compensation from another party to the individual P1. The top-up cash amount is transferred by way of an offline representation QR, which may be a scannable QR code or be readable by another form of short-range data communication, whereupon the top-up cash amount will be added to the local digital wallet by accordingly increasing the balance kept by the secure element 402.

The offline representation QR may be made available in any suitable way to the individual P1 and his or her communication device PD1, for instance by sending it as an e-mail attachment, or printing it on paper for delivery by postal mail. It is not offline in the sense that it would exclude delivery by long-range data communication from the cloud-based digital payment service; it is rather offline only in the sense that it is not dependent on the individual P1 having to make an online request for cash retrieval (like in FIG. 4A). A further way of delivery of offline top-up cash is for the digital cash service 421 to send the offline representation QR of the signed top-up token S to a network resource, such as an ATM machine. The payer P1 may then use the payer communication device PD1 to read the offline representation QR (for instance by scanning it), extract and verify the signed top-up token S, retrieve the top-up cash amount and add it to the local digital wallet.

The functionality described above can be seen at 491-495 in FIG. 4B. As can be seen, the top-up token S is similar to the one used in FIG. 4A, except that in FIG. 4B it is the digital cash service 421 that generates a top-up transaction identifier ID. Moreover, expiry information is also included in the top-up token S. Also, the digital cash service 421 includes the digital certificate PC for the payer communication device PD1 (or payer P1) when generating the signed top-up token S. This will in effect address the top-up token S specifically to the payer P1. Conveniently, the digital cash service 421 has been given access to the digital certificate PC at a previous occasion, typically when the payer P1 onboards the service and installs the application 400 in the payer communication device PD1. This can be seen at 491 and 492.

At the receiving side, the secure element 402 in the payer communication device PD1 checks that the ID of the top-up token S is not one that has been used before. A second requisite for adding the top-up amount to the balance of the local digital wallet is that according to the expiry information the top-up token S is still valid. This can be seen at 495.

As is clear from the above, the local digital wallet in the payer communication device PD1 may be topped up in different ways. Summarizing the teachings above, a generalized online digital cash top-up method involves the following (with FIG. 4A as an exemplifying embodiment):

The payer communication device PD1 generates 481 a signed STID top-up transaction identifier TID using the private cryptographic key SK of the payer communication device PD1 or payer P1. The payer communication device PD1 sends a digital cash retrieval request (482) by long-range communication to a cloud-based digital cash service 421, wherein the request 482 comprises a requested top-up amount and the signed top-up transaction identifier STID. The digital cash service 421 verifies the signed top-up transaction identifier STID using a public cryptographic key PC associated with the private cryptographic key SK of the payer communication device PD1 or payer P1. The digital cash service 421 verifies admissibility of the requested top-up amount with respect to the payer P1. The digital cash service 421 generates a signed top-up token S using a private cryptographic key of the digital cash service 421, wherein the top-up token S contains an admitted top-up amount. The digital cash service 421 sends the signed top-up token S to the payer communication device PD1 by long-range communication. The payer communication device PD1 verifies the signed top-up token S using a public cryptographic key associated with the private cryptographic key of the digital cash service 421. Finally, the payer communication device PD1 updates the balance of the local digital wallet by adding the admitted top-up amount.

A generalized offline digital cash top-up method involves the following (with FIG. 4B as an exemplifying embodiment):

A digital cash service 421 generates 491 a signed top-up token S using a private cryptographic key of the digital cash service 421, wherein the top-up token S contains a top-up amount. The digital cash service 421 generates 492 an offline representation QR of the signed top-up token S and makes the generated offline representation QR available for reading by the payer communication device PD1. The payer communication device PD1 reads 493 the offline representation QR, extracts and verifies the signed top-up token S using a public cryptographic key associated with the private cryptographic key of the digital cash service 421. Finally, the payer communication device PD1 updates the balance of the local digital wallet by adding the top-up amount.

Advantageously, the top-up may be addressed specifically to the payer P1 thanks to the following provisions. When generating (see 483; 491 in FIGS. 4A and 4B) the signed top-up token S, the digital cash service 421 includes a public cryptographic key or digital certificate PC of the payer communication device PD1. The payer communication device PD1 may then check that it is the correct recipient of the top-up by verifying that the received top-up token S comprises the public cryptographic key or digital certificate PC of the payer communication device PD1, and use this as a requisite for updating the balance of the local digital wallet by adding the top-up amount. Since this functionality occurs in the secure element 402, manipulations are prevented.

Figure 5A:
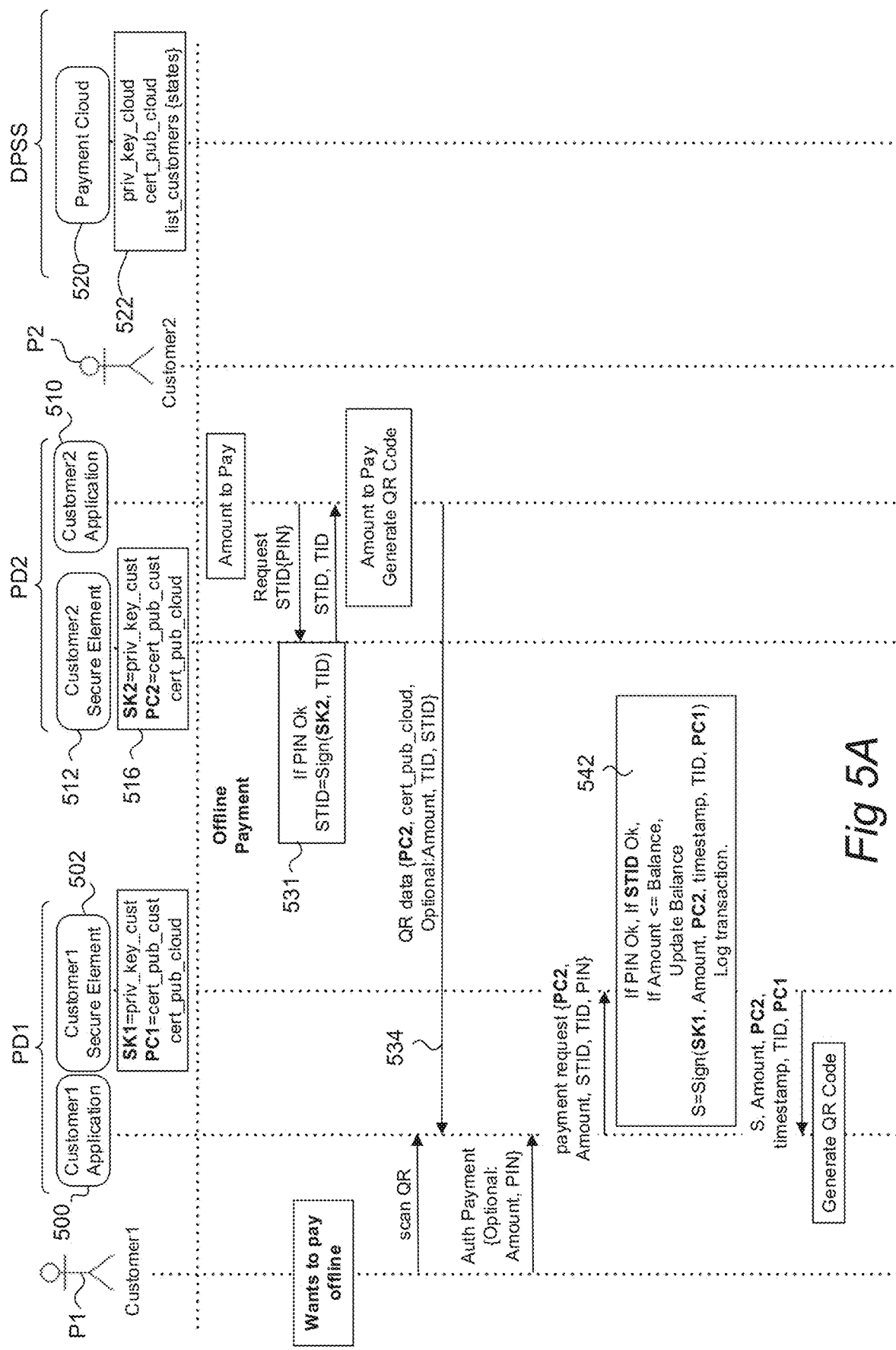
Figure 5B:
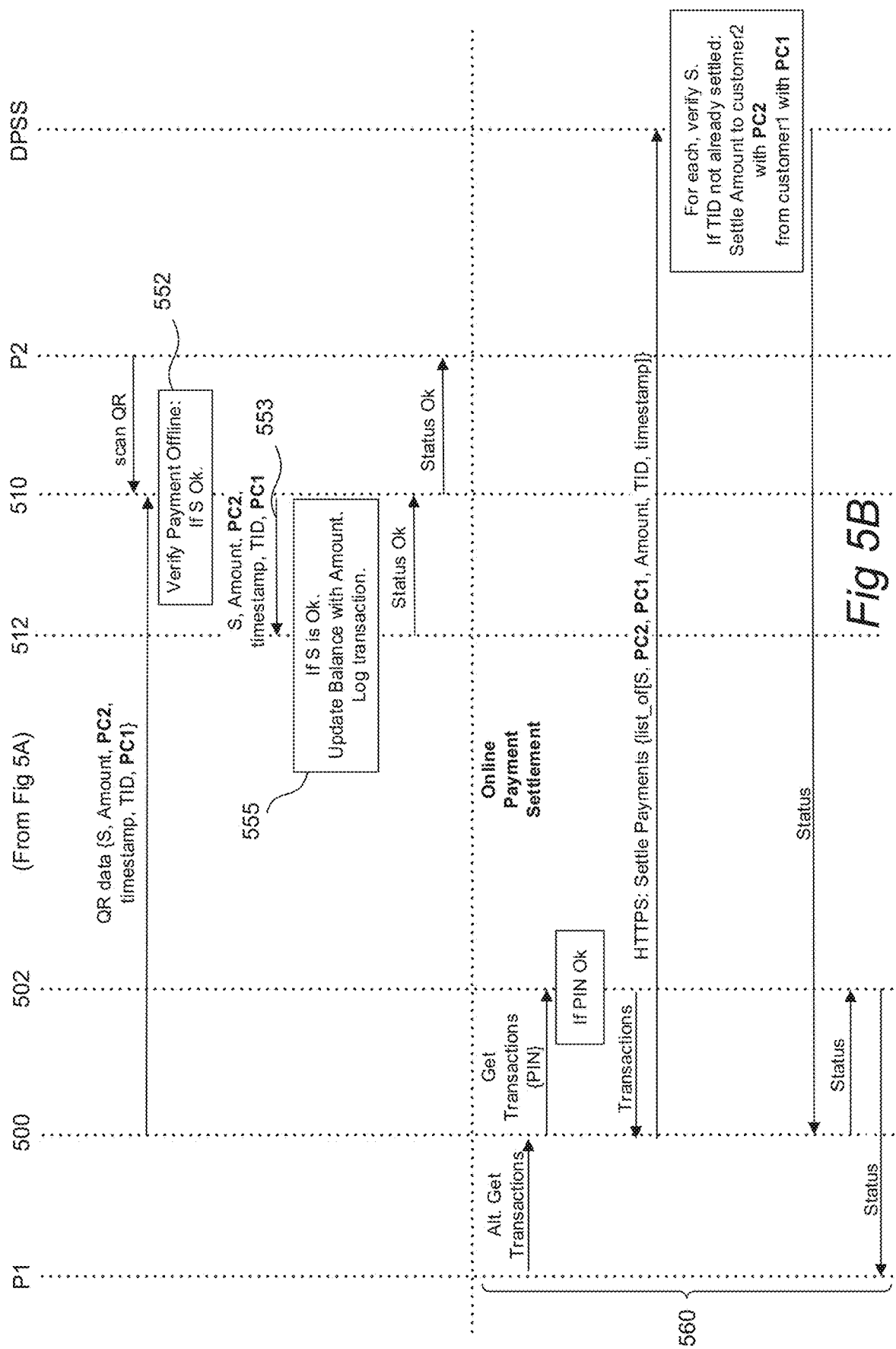

FIGS. 5A-5C disclose an alternative embodiment, which is generally similar to the embodiment described above for in FIGS. 3A-3B, but with some differences and refinements. For instance, in the alternative embodiment of FIGS. 5A-5C, the payee communication device PD2, too, has an application 510 and a secure element 512. This may improve the security and integrity of the payment system and method. The secure element 512 hence stores a private cryptographic key SK2 for the payee communication device PD2 (or payee P2), a digital certificate PC2 for the payee communication device PD2 (or payer P2) and the digital certificate cert_pub_cloud for the digital payment settlement service DPSS. See 516.

Another difference is that the transaction ID, TID, is generated at the payee side by the secure element 512, see 531. The secure element 512 also signs the generated TID using its private cryptographic key SK2, resulting in a signed dataset STID which is included in the QR data which is communicated at 534 as a QR code for scanning by the payer communication device PD1. The provision of STID allows for the secure element 502 of the payer communication device PD1 to verify it at 542 by using the digital certificate PC2 (or more specifically the public cryptographic key corresponding to the private cryptographic key SK2), as received in the QR data. Since the TID is generated at the payee communication device PD2, there is no need to generate an ID (cf. FIGS. 3A-3B) at the payer communication device PD1, and the application 510 in the payee communication device PD2 only needs to verify the signed dataset S as received in the QR data from the payer communication device PD1. See 552.

The received QR data is communicated at 553 by the application 510 to the secure element 512 upon successful verification of S (using PC1). In step 555, for maximum security, the secure element 512 may make its own independent verification of S, and then update the balance of the local digital wallet in the payee communication device PD2 by adding the payment amount to the current balance of the local digital wallet. As the reader will notice, in this embodiment the balance of the respective local digital wallet is updated not only on the payer side but also on the payee side. The update on the payee side occurs momentarily as the offline payment transaction has been successfully processed locally in the payee communication device PD2 by the secure element 512. Beneficially, as a result, the increased balance resulting from the payment by the payer P1 is directly available for use by the payee P2 in another payment transaction, this time acting as a payer, rather having to wait for an online settlement by the digital payment settlement service DPSS.

The online payment settlement procedures 560 for the payer communication device PD1 and 570 for the payee communication device PD2 may in all relevant aspects be identical to the procedures 360 and 370 described above for the embodiment of FIGS. 3A-3B.

Generalizing the embodiments of FIGS. 3A-3B and 5A-5C as described above, the skilled reader will understand that the method 600 and the corresponding communication system 200 for handling a digital payment may advantageously involve the following additional features.

The payer communication device PD1 may comprise a secure element 302, the secure element 302 storing a private cryptographic key SK1 associated with the payer P1 (or the payer communication device (PD1)). The payer communication device PD1 may use the secure element 302 to digitally sign 342 the digital payment DP by the private cryptographic key SK1 and generate the payment token S. Advantageously, the secure element 302 further stores a current balance of the local digital wallet as referred to in this document. Furthermore, the payee communication device PD2 may use a public cryptographic key PC1 associated with the private cryptographic key SK1 to verify 352 the received payment token S as a requisite for accepting the digital payment DP. Hence, the payee P2 is given a way to assess whether the digital payment from the payer P1, still only performing in the offline stage, can be considered as a guaranteed payment.

Moreover, the payer communication device PD1 may buffer the generated payment token S in or as the digital payment information DPI locally in the payer communication device PD1 (e.g. in the aforementioned buffer B1).

The public cryptographic key—which is associated with the private cryptographic key SK1 of the payer communication device PD1 or payer P1—may be comprised in a digital certificate PC1 of the payer communication device PD1 or payer P1. The digital certificate PC1 has been signed in advance by the digital payment settlement service DPSS or by another trusted central entity, such as a central bank. This may for instance occur when the payer P1 does onboarding of the digital payment services offered in the present document, e.g. by installing the application 300 in the payer communication device PD1 and signing up for the services at the digital payment settlement service DPSS. The payee communication device PD2 may use a public cryptographic key of the digital payment settlement service DPSS (or other trusted central entity) to verify (cf. steps 352; 552) the digital certificate PC1 of the payer communication device PD1 or payer P1 as a further requisite for accepting the digital payment DP. This will allow the payer P1 to put full trust in the digital payment DP at the offline settlement stage.

Advantageously, the two requisites referred to above are sufficient for the payee communication device PD2 to accept the digital payment DP, without any information that reveals a true identity of the payer P1 being communicated from the payer communication device PD1 to the payee communication device PD2. Accordingly, the personal integrity of the payer P1 is preserved.

The remote digital payment settlement service DPSS may use the public cryptographic key PC1 associated with the private cryptographic key SK1 of the payer communication device PD1 or payer P1 to verify 360, 370 the payment token S in the digital payment information DPI communicated from the payer communication device PD1 or the payee communication device PD2 as a requisite for settling the digital payment DP (online settlement). Hence, the digital payment settlement service DPSS is able to assess whether the digital payment from the payer P1 can be considered as a guaranteed payment.

The online settlement of the digital payment DP may involve the digital payment settlement service DPSS causing transfer of funds from an account held by the payer P1 at a first digital payment service DPS1 to an account held by the payee P2 at a second digital payment service DPS2 associated with the payee P2. It is recalled that the first and second digital payment services DPS1, DPS2 may be banks or other financial institutes. The second digital payment service DPS2 may use the public cryptographic key of the digital payment settlement service DPSS (or other trusted central entity) to verify the digital certificate PC1 of the payer communication device PD1 or payer P1, and it may furthermore use the public cryptographic key comprised in the digital certificate PC1 of the payer communication device PD1 or payer P1 to verify the payment token S, as requisites for accepting the transfer of funds.

Advantageously, these requisites are sufficient for the second digital payment service DPS2 to accept the transfer of funds, without access to any information that reveals a true identity of the payer P1. Again, personal integrity will be preserved.

For even further improved personal integrity, the digital payment settlement service DPSS may split the transfer of funds into a first transaction and a second transaction. In the first transaction, the first digital payment service DPS1 is the sender and the digital payment settlement service DPSS is the receiver of the funds. In the second transaction, the digital payment settlement service DPSS is the sender of the funds received by the first transaction and the second digital payment service DPS2 is the receiver of these funds. The transfer of funds from the account held by the payer P1 to the account held by the payee P2 is thus made without revealing the true identity of the payer P1 to the second digital payment service DPS2 and without revealing the true identity of the payee P2 to the first digital payment service DPS1. This functionality may, for instance, be invoked when the payer P1 and/or payer P2 has marked the digital payment DP as an anonymous payment in the application 300 and 310, respectively.

Advantageously, the digital payment DP may be addressed specifically to the payee P2 thanks to the following provisions. The payment details transmitted (e.g. 334 in FIG. 3A) by the payee communication device PD2 to the payer communication device PD1 comprises a public cryptographic key or a digital certificate PC2 of the payee communication device PD2. The payer communication device PD1 includes the public cryptographic key or digital certificate PC2 of the payee communication device PD2 when digitally signing (e.g. 342 in FIG. 3A) the digital payment DP by the private cryptographic key SK1 and generating the payment token S. The payee communication device PD2 may then check that it is the correct payment receiver by verifying (e.g. 352 in FIG. 3A) that the received payment token S comprises the public cryptographic key or digital certificate PC2 of the payee communication device PD2, and use successful verification as a requisite for accepting the digital payment DP.

The payee communication device PD2 may comprise a secure element 512 for storing a current balance of a local digital wallet maintained by the payee communication device PD2, and the payee communication device PD1 may use the secure element 512 to update 555 the balance of the local digital wallet after having verified 552 the received payment token S.

The payee communication device PD2 may generate 332 an optically readable code, such as a QR code or barcode, that contains the payment details for the digital payment DP. The payee communication device PD2 may transmit 334 the payment details for the digital payment DP to the payer communication device PD1 by short-range data communication SRDC by presenting 334 the generated optically readable code. The payer communication device PD1 may read the payment details by scanning 336 the presented optically readable code.

Similarly, the payer communication device PD1 may generate 346 an optically readable code, such as a QR code or barcode, that contains the payment token S. The payer communication device PD1 may transmit the payment token S for the digital payment DP to the payee communication device PD2 by short-range data communication SRDC by presenting 334 the generated optically readable code. The payee communication device PD2 may read the payment token S by scanning 350 the presented optically readable code.

However, other communication techniques than optical codes are certainly possible for the short-range data communication SRDC when exercising the present invention and its embodiments.

For instance, in some embodiments, the payer communication device PD1 and the payee communication device PD2 agree 610 upon the digital payment DP by the following activities:

The payee communication device PD2 transmits payment details for the digital payment DP to the payer communication device PD2 by short-range wireless RF communication. The payer communication device PD1 uses the payment details and a digital signature of the payer P1 to digitally sign the digital payment DP and generate a payment token. The payer communication device PD1 transmits the payment token to the payee communication device PD2 by short-range wireless RF communication. The payee communication device PD2 buffers the payment token in or as the digital payment information DPI locally in the payee communication device PD2, e.g. in the buffer B2 in FIGS. 2A-2C.

Alternatively, the payer communication device PD1 and the payee communication device PD2 may agree 610 upon the digital payment DP by the payee communication device PD2 presenting an optically readable code, such as a QR code or barcode, to the payer communication device PD1, wherein the optically readable code contains payment details for the digital payment DP. The payer communication device PD1 may read the payment details from the optically readable code and use the payment details and a digital signature of the payer P1 to digitally sign the digital payment DP and generate a payment token. The payer communication device PD1 may transmit the payment token to the payee communication device PD2 by short-range wireless RF communication. The payee communication device PD2 may buffer the payment token in or as the digital payment information DPI locally in the payee communication device PD2.

In this embodiment, and also in other embodiments, the payment details may comprise an amount to be paid, and at least one of the following: information about an identity of the payee P2; information about a payment account of the payee P2; and a transaction identifier ID of the digital payment DP.

As a further alternative, the payer communication device PD1 and the payee communication device PD2 may agree 610 upon the digital payment DP by the payer communication device PD1 presenting an optically readable code, such as a QR code or barcode, to the payee communication device PD2, wherein the optically readable code contains payment details for the digital payment DP. The payee communication device PD2 reads the payment details from the optically readable code and uses the payment details for the digital payment DP. The payee communication device PD2 transmits confirmatory information to the payer communication device PD1 by short-range wireless RF communication.

In this embodiment, and also in other embodiments, the payment details may comprise an amount to be paid; and at least one of the following: information about an identity of the payer P1; information about a payment account of the payer P1; information about a credit card of the payer P1; and a transaction identifier of the digital payment DP.

Generally speaking, the payer communication device PD1 and the payee communication device PD2 may agree 610 upon the digital payment DP by short-range data communication SRDC to exchange payment details for the digital payment DP, wherein the short-range data communication SRDC involves any of the following communication techniques in one or both directions between the payer communication device PD1 and the payee communication device PD2:

short-range wireless RF communication, such as Bluetooth, BLE, RFID, WLAN, WiFi, mesh communication, or another form of proximity-based device-to-device radio communication signal such as LTE Direct;
NFC;
audio communication
sound communication;
optical communication, such as IrDA, QR or barcode.

In embodiments where the short-range data communication SRDC involves short-range wireless RF communication, the payer communication device PD1 and/or the payee communication device PD2 may advantageously use short-range wireless RF communication also as a preparatory means for detecting the proximity 202 between the devices PD1, PD2. This may, for instance, involve detecting and evaluating a received signal strength of a communication signal from the other device. Some feasible technology portfolios are disclosed in Swedish patent applications 1751432-4 and 1950334-1, the contents of which are incorporated herein in their entirety.

The long-range communication LRDC1, LRDC2 as referred to in this document may take place over any available wide area network (WAN), such as the internet or a part thereof. Broadband data communication and wide area network (WAN) communication are to be considered as a synonym of long-range data communication. The wide area network (WAN) may, for instance, be compliant with one or more of W-CDMA, GSM, UTRAN, HSPA, LTE, LTE Advanced or 5G, and the long-range (broadband) data communication may be TCP/IP traffic.

Figure 7:
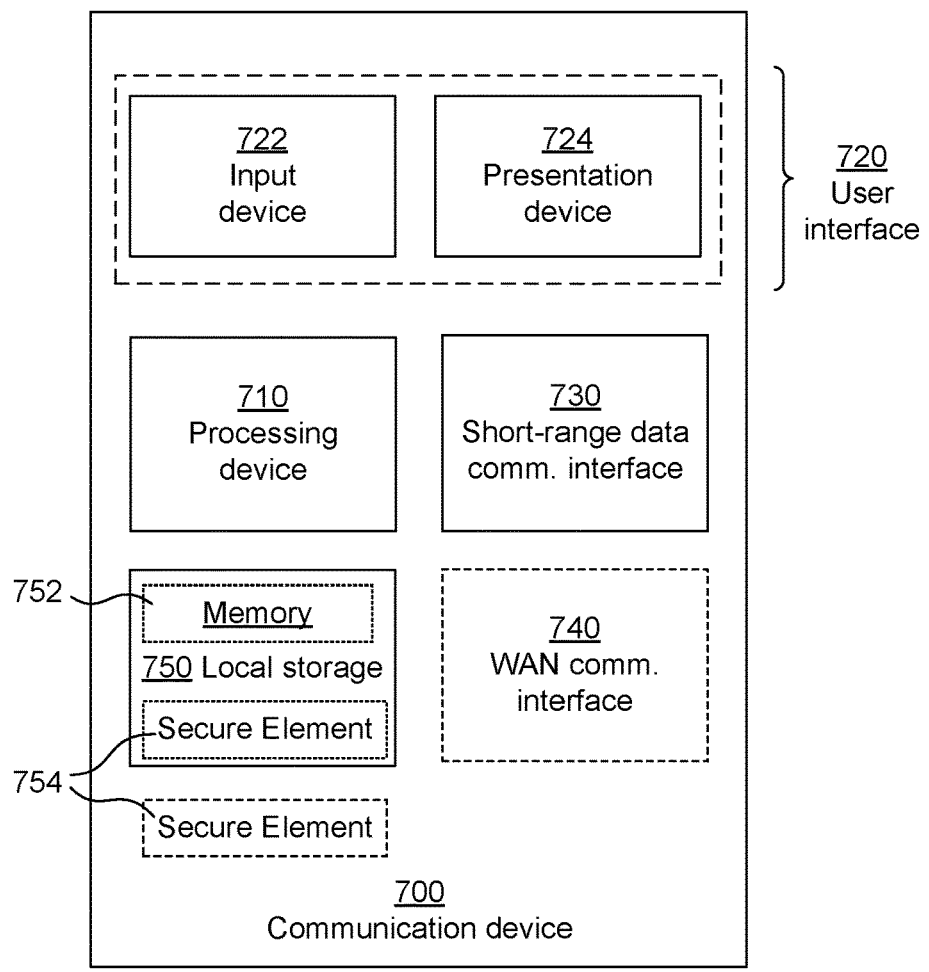
FIG. 7 is a schematic block diagram of a communication device in embodiments of the present invention.

FIG. 7 is a schematic block diagram of a communication device 700 in embodiments of the present invention. The payee communication device PD1 may be implemented by such a communication device 700 in embodiments of the invention. Likewise, the payer communication device PD2 may be implemented by such a communication device 700 in embodiments of the invention.

The communication device 700 comprises a processing device 710, a user interface 720, a short-range data communication interface 730, a WAN communication interface 740 and a local storage 750 which includes a memory 752.

The user interface 720 comprises an input device 722 and a presentation device 724, as is generally known per se. In some embodiments, the input device 722 and the presentation device 724 are constituted by one common physical device, such as for instance a touch screen (touch-sensitive display screen), implemented in for instance resistive touch technology, surface capacitive technology, projected capacitive technology, surface acoustic wave technology or infrared technology.

The short-range data communication interface 730 is configured for Bluetooth communication, or any other radio-based short-range wireless data communication such as, for instance, Bluetooth Low Energy, RFID, WLAN, WiFi, mesh communication or LTE Direct, without limitation, or any non-radio-based short-range wireless data communication such as, for instance, magnetic communication (such as NFC), (ultra)sound communication, or optical communication (such as IrDA) without limitation. In some embodiments, the short-range data communication interface 730 comprises equipment and functionality for presenting a QR code (when acting as a payee communication device PD2) or for scanning a QR code (when acting as a payer communication device PD1).

The WAN communication interface 740 is configured for wide area network communication compliant with, for instance, one or more of W-CDMA, GSM, UTRAN, HSPA, LTE, LTE Advanced or 5G, and TCP/IP, and/or WLAN (WiFi), without limitation.

The processing device 710 may be implemented in any known controller technology, including but not limited to microcontroller, processor (e.g. PLC, CPU, DSP), FPGA, ASIC or any other suitable digital and/or analog circuitry capable of performing the intended functionality.

The memory 752 may be implemented in any known memory technology, including but not limited to ROM, RAM, SRAM, DRAM, CMOS, FLASH, DDR, SDRAM or some other memory technology. In some embodiments, the memory or parts thereof may be integrated with or internal to the processing device 710. The memory may store program instruction for execution by the processing device 710 (also see the description of FIG. 8 below), as well as temporary and permanent data for use by the processing device 710.

The communication device 700 may further comprise a Secure Element 754, i.e. a tamper-resistant hardware or virtual platform. In the latter case, the Secure Element 754 is implemented in software and may reside in the local storage 750 or even the memory 752 thereof. The Secure Element 754 is capable of securely hosting applications and storing confidential and cryptographic data and therefore provides a trusted execution environment, a.k.a. secure runtime. Advantageously, some of the data and functionality in embodiments of the invention may be stored in and performed by the Secure Element 754 (cf. 302 in FIGS. 3A-B, 402 in FIGS. 4A-B, and 502 and 512 in FIGS. 5A-B).

The communication device 700 may therefore be configured to perform the functionality of the payer communication device PD1 as defined in and described above for the method 600 and any or all of its embodiments. The payer communication device PD1 may thus be implemented by the communication device 700 in the form of, for instance, a mobile communication device a mobile phone a smart phone, a tablet computer, a personal digital assistant, a portable computer, smart glasses, a smart wearable (e.g. smart watch or smart bracelet), or a smart card.

Alternatively, (another instance of) the communication device 700 may be configured to perform the functionality of the payee communication device PD2 as defined in and described above for the method 600 and any or all of its embodiments. The payee communication device PD2 may thus be implemented by the communication device 700 in the form of, for instance, a mobile communication device a mobile phone a smart phone, a tablet computer, a personal digital assistant, a portable computer, smart glasses, a smart card, a smart wearable (e.g. smart watch or smart bracelet), a payment terminal, a service terminal, a point-of-sales terminal, a checkout counter, a delivery pickup point, a vending machine, a ticket machine, a dispensing machine, or an access control system.

Figure 8:
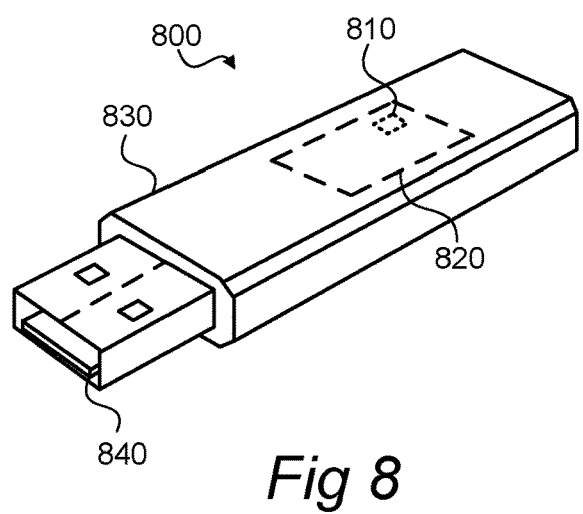
FIG. 8 is a schematic illustration of a computer-readable medium in one exemplary embodiment, capable of storing a computer program product.

FIG. 8 is a schematic illustration of a computer-readable medium 800 in one exemplary embodiment, capable of storing a computer program product 810. The computer-readable medium 800 in the disclosed embodiment is a memory stick, such as a Universal Serial Bus (USB) stick; the computer-readable medium 800 may however be embodied in various other ways instead, as is well-known per se to the skilled person. The USB stick 800 comprises a housing 830 having an interface, such as a connector 840, and a memory chip 820. In the disclosed embodiment, the memory chip 820 is a flash memory, i.e. a non-volatile data storage that can be electrically erased and re-programmed. The memory chip 820 stores the computer program product 810 which is programmed with computer program code (instructions) that when loaded into a processing device, such as a CPU, will perform a method for handling a digital payment according to any or all of the embodiments disclosed above. The processing device may, for instance, be the aforementioned processing device 710. The USB stick 800 is arranged to be connected to and read by a reading device for loading the instructions into the processing device. It should be noted that a computer-readable medium can also be other mediums such as compact discs, digital video discs, hard drives or other memory technologies commonly used. The computer program code (instructions) can also be downloaded from the computer-readable medium via a wireless interface to be loaded into the processing device.

Figure 9B:
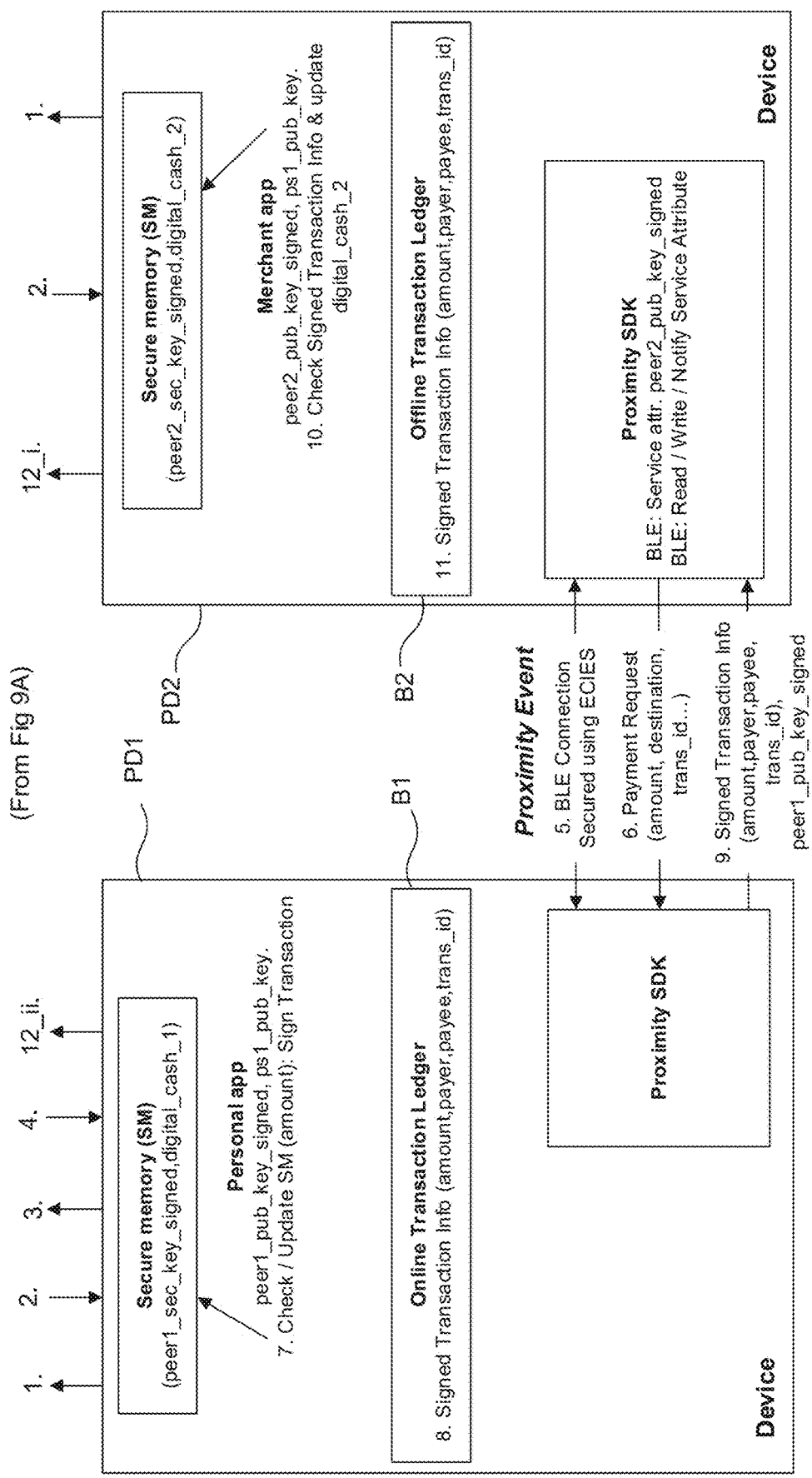

In one embodiment, therefore, the computer program product 810 comprises computer code for performing the functionality of the payer communication device PD1 in the method as described herein when the computer program code is executed by the processing device. In another embodiment, the computer program product 810 comprises computer code for performing the functionality of the payee communication device PD2 in the method as described herein when the computer program code is executed by the processing device. In still another embodiment, the computer program product 810 comprises computer code for performing the functionality of the digital payment settlement service DPSS) in the method as described herein when the computer program code is executed by the processing device. In another embodiment, FIGS. 9A and 9B illustrate a schematic diagram of a communication system for handling digital proximity payments according to an embodiment of the present invention. As for the other embodiments, the communication system comprises a first communication device in the form of a payer communication device PD1, a second communication device in the form of a payee communication device PD2, and a digital payment settlement service DPSS. The system can be used for performing a method for handling a digital payment between a payer P1 and a payee P2, as previously explained. In the embodiment of FIGS. 9A and 9B, this will involve the following activity.

As seen at preparatory steps 1 and 2, each of the payer communication device PD1 and payee communication device PD2 requests and receives a respective cryptographic key pair from the cloud, which may include the digital payment settlement service DPSS and a national bank cloud. The respective cryptographic key pair comprises a public key and a private (secure) key, as is generally known for asymmetric data encryption and decryption. The private (secure) key is advantageously accommodated in secure memory SM in the respective device.

As seen at further preparatory steps 3 and 4, the payer communication device PD1 requests and receives digital cash, to be accommodated in the secure memory SM as a local digital wallet, as previously described. The payee communication device PD2 may have its own local digital wallet to accommodate digital cash in its secure memory SM, as is seen in FIGS. 9A and 9B.

Then, a digital payment between the payer P1 and payee P2 is executed as follows. At step 5, the payer communication device PD1 and payee communication device PD2 establish a connection for short-range data communication SRDC such as Bluetooth or BLE, or any other kind of suitable short-range data communication SRDC as previously explained. One suitable technology, without limitation, is disclosed in applicant's Swedish patent application 2050806-5, the contents of which are incorporated herein by reference.

The payee communication device PD2 initiates a payment transaction and sends a payment request to the payer communication device PD1 in step 6. In step 7, the payer communication device PD1 checks the current balance or credit of the local digital wallet to that it is enough to cover the payment amount. If the check passes, the payer communication device PD1 updates the current balance or credit of the local digital wallet by deducting the payment amount of the digital payment to be performed. The payer communication device PD1 moreover signs the transaction information of the payment transaction with its private (secure) key, and stores the signed transaction information (cf. digital payment information DPI as previously described) in the local buffer B1 ("Offline Transaction Ledger") in step 8.

The payer communication device PD1 then sends the signed transaction information, together with its public key, to the payee communication device PD2 in step 9. The payee communication device PD2 checks the received signed transaction information in step 10 using the received public key. If the check is passed, the payee communication device PD2 proceeds to update its digital cash, accommodated in the local digital wallet in the secure memory SM, with the amount of the payment transaction. It moreover stores the signed transaction information (cf. digital payment information DPI as previously described) in the local buffer B2 ("Offline Transaction Ledger") in step 11.

When any of the payer communication device PD1 or payee communication device PD2 is online, it may communicate the contents of the buffer B1 and B2, respectively, by long-range data communication LRDC1 and LRDC2, respectively (as previously described) with the digital payment settlement service DPSS in step 12.

In step 13, the digital payment settlement service DPSS checks the received transaction information (e.g. signature verification) and executes the settlement of the digital payment represented by the payment transaction, as previously described.

It shall be noted that once the local digital wallet of the payee communication device PD2 has been updated with the payment amount of the present payment transaction (i.e., its local balance or credit has been increased by the payment amount of the present payment transaction), this added payment amount will be immediately available for use at will by the payee communication device PD2 (i.e. payee P2) to perform a new digital payment with a third user/communication device, this time acting as a payer. In other words, the payee communication device PD2 will not have to wait for online access to the digital payment settlement service DPSS to settle the present payment transaction with the payer communication device PD1 before making the new digital payment with said third user/communication device and spending all or some of the credit thus being made available from the present payment transaction with the payer communication device PD1. Both the present payment transaction and the new payment transaction will be ultimately settled in due time when any of the involved devices gains online access to the digital payment settlement service DPSS, and the respective actors (P1, P2, the third user) will ultimately be debited or credited the respective amounts called for by the present payment transaction and the new payment transaction.

Correspondingly, the current balance or credit of the local digital wallet in the payer communication device PD1 may consist partly or wholly of digital cash previously received as one or more digital payments from one or more other devices and not yet settled with the digital payment settlement service DPSS. Accordingly, the payer communication device PD1 may use such "unsettled" digital cash for the purpose of the present payment transaction with the payee communication device PD2.

Figure 10:
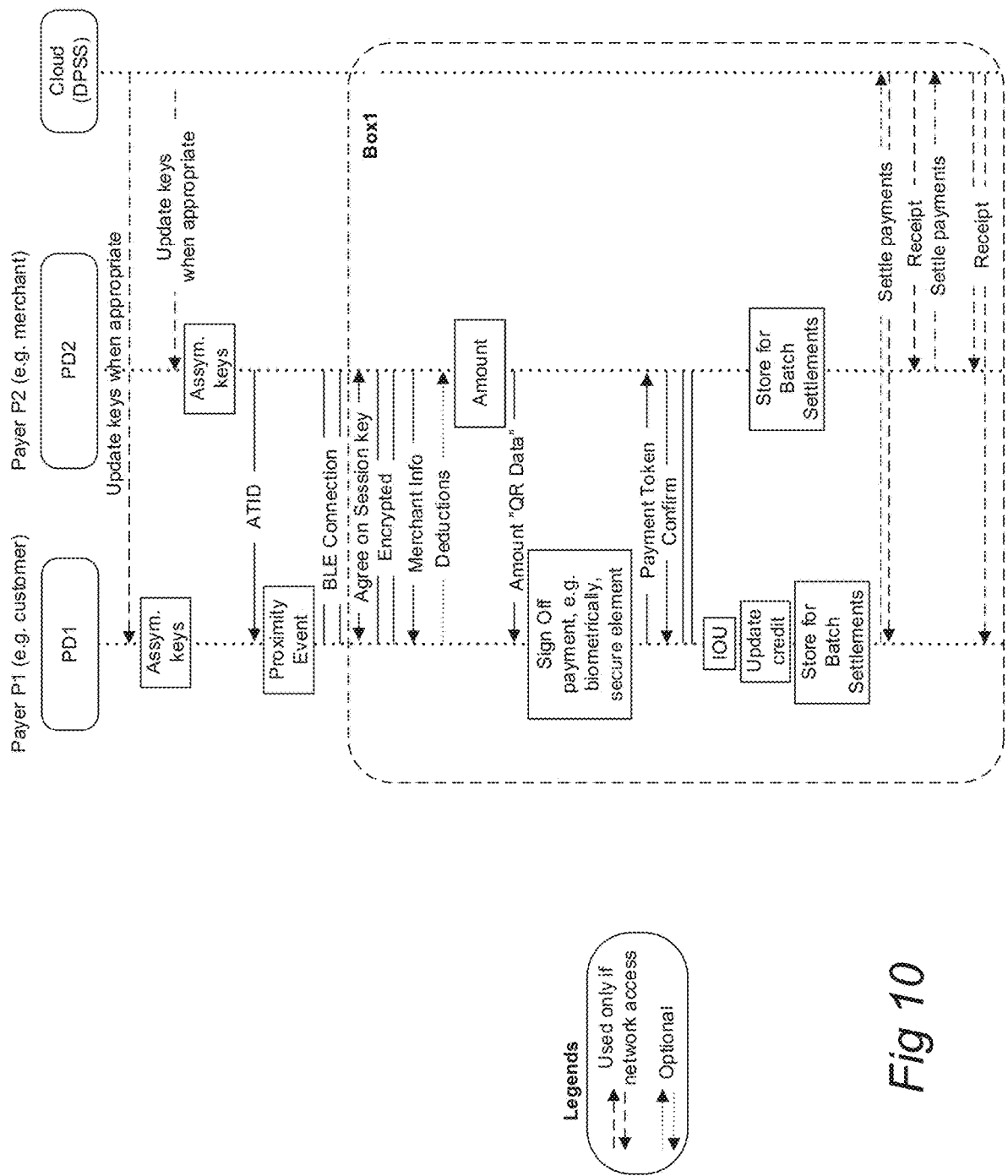
FIG. 10 illustrates a schematic diagram of a communication system for handling digital proximity payments according to another alternative embodiment of the present invention.

FIG. 10 illustrates a schematic diagram of a communication system for handling digital proximity payments according to another alternative embodiment of the communication system 200 according to the present invention.

It is recalled from the previous description that the communication system 200 is for handling a digital payment between a payer P1 and a payee P2. The communication system 200 comprises a payee communication device PD1 for use by the payer P1, a payer communication device PD2 for use by the payee (P2), and digital payment settlement service (DPSS) being accessible by wide-area network (WAN) communication.

It is also recalled that the payer communication device PD1 and the payee communication device PD2 are configured for using short-range data communication SRDC when the devices PD1, PD2 are in proximity of each other to agree upon a digital payment DP without requiring long-range data communication with the remote digital payment settlement service DPSS at that stage.

It is further recalled that the payer communication device PD1 and the payee communication device PD2 are configured for buffering digital payment information DPI pertaining to the digital payment DP locally in the respective device PD1, PD2.

It is finally recalled that the remote digital payment settlement service DPSS is configured for causing settlement of the digital payment DP as indicated by the digital payment information DPI received by long-range data communication LRDC1, LRDC2 from one of the payer communication device and the payee communication device PD1, PD2 without having to wait for the digital payment information to be received from the other one of the payer communication device and the payee communication device PD1, PD2.

With reference to, for instance, FIG. 10, in this communication system 200 the first communication device PD1 may be configured for:
  receiving payment details from the payee device PD2 or the payee P2;
  generating a transaction record DPI representing a desired digital payment DP based on the received payment details;
  creating a payment token by applying a digital signature of the payer to the transaction record DPI;
  communicating the payment token to the second communication device PD2 by short-range data communication SRDC;
  storing the transaction record DPI in a local buffer B1 for later batch processing;
  determining at a later stage that the digital payment settlement service DPSS is reachable by long-range data communication LRDC1; and
  communicating the stored transaction record DPI together with any other transaction records stored in the local buffer B1 as a batch of transaction records to the digital payment settlement service DPSS by long-range data communication LRDC1.

The second communication device PD2 in the communication system 200 may correspondingly configured for:
  receiving the payment token from the first communication device by short-range data communication;
  storing the received payment token DPI in a local buffer B2;
  determining at a later stage that the digital payment settlement service DPSS is reachable by long-range data communication LRDC2; and
  communicating the stored payment token DPI together with any other payment tokens stored in the local buffer B2 as a batch of payment tokens to the digital payment settlement service DPSS by long-range data communication LRDC2.

The digital payment settlement service DPSS in the communication system 200 may be configured for:

receiving by long-range data communication LRDC1, LRDC2 either a batch of transaction records from the first communication device PD1 or a batch of payment tokens from the second communication device PD2; and processing the batch of transaction records or the batch of payment tokens, whichever is available first, to cause settlement of the payments represented thereby.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for handling a digital payment between a payer and a payee, the method comprising:
   a payer communication device, used by the payer, and a payee communication device, used by the payee, using short-range data communication when the devices are in proximity of each other to agree upon a digital payment without requiring long-range data communication with a remote digital payment settlement service at that stage;
   the payer communication device and the payee communication device both buffering digital payment information pertaining to the digital payment locally in the respective device;
   independently of the other device, the payer communication device or the payee communication device subsequently communicating the buffered digital payment information to the remote digital payment settlement service by long-range data communication; and
   the remote digital payment settlement service causing settlement of the digital payment as indicated by the digital payment information received by long-range data communication from one of the payer communication device and the payee communication device without having to wait for the digital payment information to be received from the other one of the payer communication device and the payee communication device,
   wherein the payer communication device and the payee communication device agree upon the digital payment by:
   the payee communication device transmitting payment details for the digital payment to the payer communication device by short-range data communication,
   the payer communication device using the payment details and a digital signature of the payer to digitally sign the digital payment and generate a payment token,
   the payer communication device transmitting the payment token to the payee communication device by short-range data communication, and
   the payee communication device buffering the received payment token in or as said digital payment information locally in the payee communication device,
   wherein the payer communication device comprises a secure element, the secure element storing a private cryptographic key of the payer communication device or payer, the payer communication device using the secure element to digitally sign the digital payment by the private cryptographic key and generate the payment token, and
   wherein the payee communication device uses a public cryptographic key associated with the private cryptographic key of the payer communication device or payer to verify the received payment token as a requisite for accepting the digital payment.

2. The method as defined in claim 1, further comprising:
   the payer communication device retrieving a credit amount from a digital payment service by long-range data communication;
   the payer communication device entering the credit amount in a local digital wallet maintained by the payer communication device;
   prior to agreeing upon the digital payment with the payee communication device, the payer communication device checking whether the local digital wallet has sufficient funds for the digital payment; and
   only when the local digital wallet has sufficient funds for the digital payment, deducting an amount of the digital payment from the local digital wallet, and proceeding with the digital payment.

3. The method as defined in claim 2, further comprising the payment communication device to automatically requesting a replenishment credit amount from a digital payment service by long-range data communication, wherein the replenishment credit amount corresponding to a difference between a desired credit level and a current balance of the local digital wallet, so that the balance of the local digital wallet is topped up to the desired credit level.

4. The method as defined in claim 1, further comprising the payee communication device using the buffered digital payment information to allow the payee of the payee communication device to act as a payment sender of another payment to another payment receiver by transferring the buffered digital payment information to another communication device used by said another payment receiver,
   wherein, when said another payment receiver is proximate to the payee, said another payment is handled in accordance with the method for handling a digital payment according to claim 1; and
   wherein, when said another payment receiver is not proximate to the payee, said another payment is handled by the payee communication device making a cloud-based payment transaction by long-range data communication with the remote digital payment settlement service or a digital payment service.

5. The method as defined in claim 1, wherein the public cryptographic key is comprised in a digital certificate of the payer communication device or payer, the digital certificate having been signed by the digital payment settlement service or another trusted central entity, the method further comprising:
   the payee communication device using a public cryptographic key of the digital payment settlement service or other trusted central entity to verify the digital certificate of the payer communication device or payer as a further requisite for accepting the digital payment.

6. The method as defined in claim 5, wherein said requisite and said further requisite are sufficient for the payee communication device to accept the digital payment, without any information that reveals a true identity of the payer being communicated from the payer communication device to the payee communication device.

7. The method as defined in claim 1, wherein the method further comprises the payer communication device buffering the generated payment token in or as said digital payment information locally in the payer communication device.

8. The method as defined in claim 7, wherein the method further comprises the remote digital payment settlement service using the public cryptographic key associated with the private cryptographic key of the payer communication device or payer to verify the payment token in the digital payment information communicated from the payer communication device or the payee communication device as a requisite for settling the digital payment.

9. The method as defined in claim 8, wherein settling the digital payment comprises the digital payment settlement service causing transfer of funds from an account held by the payer at a first digital payment service to an account held by the payee at a second digital payment service associated with the payee, the method further comprising:

the second digital payment service using the public cryptographic key of the digital payment settlement service or other trusted central entity to verify the digital certificate of the payer communication device or payer, and using the public cryptographic key comprised in the digital certificate of the payer communication device or payer to verify the payment token, as requisites for accepting the transfer of funds.

10. The method as defined in claim 9, wherein said requisites are sufficient for the second digital payment service to accept the transfer of funds, without access to any information that reveals a true identity of the payer.

11. The method as defined in claim 9, the method further comprising:

the digital payment settlement service splitting the transfer of funds into a first transaction and a second transaction, with the first digital payment service being a sender and the digital payment settlement service being a receiver of the funds in the first transaction, and with the digital payment settlement service being a sender of the funds received by the first transaction and the second digital payment service being a receiver of these funds, wherein the transfer of funds from the account held by the payer to the account held by the payee is made without revealing a true identity of the payer to the second digital payment service and without revealing a true identity of the payee to the first digital payment service.

12. The method as defined in claim 1, wherein:

the payment details transmitted by the payee communication device to the payer communication device comprises a public cryptographic key or a digital certificate of the payee communication device;

the payer communication device includes the public cryptographic key or digital certificate of the payee communication device when digitally signing the digital payment by the private cryptographic key and generating the payment token; and the payee communication device verifying that the received payment token comprises the public cryptographic key or digital certificate of the payee communication device as a requisite for accepting the digital payment.

13. The method as defined in claim 1, the secure element further storing a current balance of a local digital wallet in the payer communication device, the method further comprising:

the payer communication device generating a signed top-up transaction identifier using the private cryptographic key of the payer communication device or payer;

the payer communication device sending a digital cash retrieval request by long-range communication to a cloud-based digital cash service, wherein the request comprises a requested top-up amount and the signed top-up transaction identifier;

the digital cash service verifying the signed top-up transaction identifier using a public cryptographic key associated with the private cryptographic key of the payer communication device or payer;

the digital cash service verifying admissibility of the requested top-up amount with respect to the payer;

the digital cash service generating a signed top-up token using a private cryptographic key of the digital cash service, wherein the top-up token contains an admitted top-up amount;

the digital cash service sending the signed top-up token to the payer communication device by long-range communication;

the payer communication device verifying the signed top-up token using a public cryptographic key associated with the private cryptographic key of the digital cash service; and the payer communication device updating the balance of the local digital wallet by adding the admitted top-up amount.

14. The method as defined in claim 1, the secure element further storing a current balance of a local digital wallet in the payer communication device, the method further comprising:

a digital cash service generating a signed top-up token using a private cryptographic key of the digital cash service, wherein the top-up token contains a top-up amount;

the digital cash service generating an offline representation of the signed top-up token and making the generated offline representation available for reading by the payer communication device;

the payer communication device reading the offline representation, extracting and verifying the signed top-up token using a public cryptographic key associated with the private cryptographic key of the digital cash service; and the payer communication device updating the balance of the local digital wallet by adding the top-up amount.

15. The method as defined in claim 13, wherein:

the digital cash service includes a public cryptographic key or digital certificate of the payer communication device when generating the signed top-up token; and the payer communication device verifying that the received top-up token comprises the public cryptographic key or digital certificate of the payer communication device as a requisite for updating the balance of the local digital wallet by adding the top-up amount.

16. The method as defined in claim 1, wherein the payment details comprises an amount to be paid, and at least one of the following:

information about an identity of the payee;

information about a payment account of the payee; and a transaction identifier of the digital payment.

17. The method as defined in claim 1, wherein the payer communication device and the payee communication device agree upon the digital payment by short-range data communication to exchange payment details for the digital payment, wherein the short-range data communication comprises any of the following communication techniques in one or both directions between the payer communication device and the payee communication device:

short-range wireless RF communication, such as Bluetooth, BLE, RFID, WLAN, WiFi, mesh communication, or another form of proximity-based device-to-device radio communication signal such as LTE Direct;

NFC;

audio communication;
ultrasound communication;
optical communication, such as IrDA, QR or barcode.

18. The method as defined in claim 17, wherein the payer communication device and/or the payee communication device use(s) short-range wireless RF communication as a preparatory means for detecting proximity between the devices.

19. The method as defined in claim 1,
wherein each of the payer communication device and the payee communication device buffer also digital payment information for other digital payments that they have agreed upon, with each other or with other payees and payers, respectively,
wherein each of the payer communication device and the payee communication device communicates a batch of such buffered digital payment information to the remote digital payment settlement service by long-range data communication, the batch including aforesaid digital payment, and
wherein the remote digital payment settlement service receives the batch of buffered digital payment information as received from the payer communication device or the payee communication device, whichever occurs first, and processes each digital payment contained in the batch to cause settlement thereof, unless not already settled.

20. A communication device configured to perform the functionality of the payer communication device as defined in the method of claim 1.

21. A communication device configured to perform the functionality of the payee communication device as defined in the method of claim 1.

22. A communication system for handling a digital payment between a payer and a payee, the system comprising:
a payer communication device for use by the payer;
a payee communication device for use by the payee; and
digital payment settlement service being accessible by wide-area network communication,
wherein the payer communication device and the payee communication device are configured for using short-range data communication when the devices are in proximity of each other to agree upon a digital payment without requiring long-range data communication with the remote digital payment settlement service at that stage,
wherein the payer communication device and the payee communication device are further configured for buffering digital payment information pertaining to the digital payment locally in the respective device,
wherein the remote digital payment settlement service is configured for causing settlement of the digital payment as indicated by the digital payment information received by long-range data communication from one of the payer communication device and the payee communication device without having to wait for the digital payment information to be received from the other one of the payer communication device and the payee communication device,
wherein the payer communication device and the payee communication device are configured to agree upon the digital payment by:
the payee communication device transmitting payment details for the digital payment to the payer communication device by short-range data communication,
the payer communication device using the payment details and a digital signature of the payer to digitally sign the digital payment and generate a payment token,
the payer communication device transmitting the payment token to the payee communication device by short-range data communication, and
the payee communication device buffering the received payment token in or as said digital payment information locally in the payee communication device,
wherein the payer communication device comprises a secure element, the secure element storing a private cryptographic key of the payer communication device or payer, the payer communication device being configured for using the secure element to digitally sign the digital payment by the private cryptographic key and generate the payment token, and
wherein the payee communication device is configured for using a public cryptographic key associated with the private cryptographic key of the payer communication device or payer to verify the received payment token as a requisite for accepting the digital payment.

23. A non-transitory computer readable medium having stored thereon a computer program comprising computer program code for performing the functionality of the payee communication device in the method as defined in claim 1 when the computer program code is executed by a processing device.

24. A non-transitory computer readable medium having stored thereon a computer program comprising computer program code for performing the functionality of the payer communication device in the method as defined in claim 1 when the computer program code is executed by a processing device.

25. A non-transitory computer readable medium having stored thereon a computer program comprising computer program code for performing the functionality of the digital payment settlement service in the method as defined in claim 1 when the computer program code is executed by a processing device.

* * * * *